US012302099B2

(12) United States Patent
Yapici et al.

(10) Patent No.: US 12,302,099 B2
(45) Date of Patent: May 13, 2025

(54) SECURE CONFIGURATION SHARING OVER REFERENCE SIGNALS

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/857,930

(22) Filed: Jul. 5, 2022

(65) Prior Publication Data
US 2024/0015506 A1  Jan. 11, 2024

(51) Int. Cl.
*H04W 12/069* (2021.01)
*H04L 5/00* (2006.01)
(Continued)

(52) U.S. Cl.
CPC ......... *H04W 12/065* (2021.01); *H04L 5/0051* (2013.01); *H04L 5/12* (2013.01); *H04W 12/069* (2021.01); *H04W 12/122* (2021.01)

(58) Field of Classification Search
CPC . H04W 12/065; H04W 12/79; H04W 12/069; H04W 12/106; H04W 12/122;
(Continued)

(56) References Cited

U.S. PATENT DOCUMENTS 11,757,694 B1 * 9/2023 Yapici ..................... H04L 27/38
375/262
2017/0338956 A1   11/2017 Badawy et al.
(Continued)

FOREIGN PATENT DOCUMENTS

CN          105978692 A      9/2016
WO    WO-2008033805 A2 *  3/2008  ........... H04L 1/0041
WO    WO-2021030708 A1 *  2/2021  ........... H04L 9/0819

OTHER PUBLICATIONS

H. Koorapaty, A. A. Hassan and S. Chennakeshu, "Secure information transmission for mobile radio," in IEEE Communications Letters, vol. 4, No. 2, pp. 52-55, Feb. 2000 (Year: 2000).*

(Continued)

*Primary Examiner* — Zhimei Zhu
(74) *Attorney, Agent, or Firm* — Holland & Hart LLP

(57) ABSTRACT

Methods, systems, and devices for wireless communications are described. Disclosed techniques provide for reliable and secure sharing of configuration parameters over physical layer reference signals. A first network node may transmit a first signal conveying a first phase to a second network node. The second network node may transmit a second signal conveying a second phase, the second phase based on the first phase and an authentication parameter common to the first and second network nodes. The first network node may determine that the second phase is based on the first phase and the authentication parameter. Based on determining that the second phase is based on the authentication parameter, the first network node may transmit a third signal conveying a third phase to the second network node, the third phase indicating a signature parameter. The first network node and the second network node may communicate based on the signature parameter.

26 Claims, 17 Drawing Sheets

(51) Int. Cl.
*H04L 5/12* (2006.01)
*H04W 12/065* (2021.01)
*H04W 12/122* (2021.01)

(58) Field of Classification Search
CPC ....... H04L 5/0051; H04L 5/12; H04L 9/0838; H04L 9/0875
See application file for complete search history.

(56) References Cited

U.S. PATENT DOCUMENTS

2018/0045833 A1* 2/2018 Wu .................. G01S 19/54
2022/0141064 A1   5/2022 Horn et al.
2022/0150063 A2   5/2022 Ramabadran et al.

OTHER PUBLICATIONS

International Search Report and Written Opinion—PCT/US2023/026862—ISA/EPO—Sep. 22, 2023.
Wu X., et al., "A Physical-Layer Authentication Assisted Scheme for Enhancing 3GPP Authentication", arxiv.org, Cornell University Library, 201 Olin Library Cornell University Ithaca, NY 14853, Feb. 26, 2015, pp. 1-12, XP080807906, The Whole Document.

* cited by examiner

SECURE CONFIGURATION SHARING OVER REFERENCE SIGNALS

INTRODUCTION

The following relates to wireless communications relating to secure configuration sharing over reference signals. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support secure configuration sharing over reference signals. For example, the described techniques provide for reliable and secure sharing of configuration parameters over physical layer (PHY) reference signals. A first network node may transmit a first signal conveying a first phase to a second network node. The second network node may transmit, to the first network node, a second signal conveying a second phase, where the second phase is based on the first phase and an authentication parameter common to the first network node and the second network node. The first network node may determine, based on channel coherency, that the second phase is based on the first phase and the authentication parameter. Accordingly, the first network node may authenticate the second network node. Based on determining that the second phase is based on the authentication parameter, the first network node may transmit a third signal conveying a third phase to the second network node, where the third phase indicates a signature parameter. Based on the second phase, the second network node may extract the signature parameter from the third phase. The first network node and the second network node may communicate based on the signature parameter. For example, the first network node may encode data signals using the signature parameter, and the second network node may decode data signals using the signature parameter.

A method for wireless communications at a first network node is described. The method may include receiving, from a second network node, a first signal conveying a first phase, transmitting, to the second network node, a second signal conveying a second phase, where the second phase is based on an authentication parameter common to the first network node and the second network node and the first phase, receiving, from the second network node, a third signal conveying a third phase, where the third phase is indicative of a signature parameter, and where the third signal is responsive to the second signal, and communicating with the second network node based on the signature parameter.

A first network node for wireless communications is described. The first network node may include a memory and at least one processor coupled to the memory. The at least one processor may be configured to receive, from a second network node, a first signal conveying a first phase, transmit, to the second network node, a second signal conveying a second phase, where the second phase is based on an authentication parameter common to the first network node and the second network node and the first phase, receive, from the second network node, a third signal conveying a third phase, where the third phase is indicative of a signature parameter, and where the third signal is responsive to the second signal, and communicate with the second network node based on the signature parameter.

Another apparatus for wireless communications at a first network node is described. The apparatus may include means for receiving, from a second network node, a first signal conveying a first phase, means for transmitting, to the second network node, a second signal conveying a second phase, where the second phase is based on an authentication parameter common to the first network node and the second network node and the first phase, means for receiving, from the second network node, a third signal conveying a third phase, where the third phase is indicative of a signature parameter, and where the third signal is responsive to the second signal, and means for communicating with the second network node based on the signature parameter.

A non-transitory computer-readable medium having code for wireless communication stored thereon is described. The code when executed by a first network node, causes the first network node to receive, from a second network node, a first signal conveying a first phase, transmit, to the second network node, a second signal conveying a second phase, where the second phase is based on an authentication parameter common to the first network node and the second network node and the first phase, receive, from the second network node, a third signal conveying a third phase, where the third phase is indicative of a signature parameter, and where the third signal is responsive to the second signal, and communicate with the second network node based on the signature parameter.

In some examples of the method, first network nodes, apparatuses, and non-transitory computer-readable medium described herein, communicating with the second network node based on the signature parameter may include operations, features, means, or instructions for receiving, from the second network node, a data signal and decoding the data signal based on the signature parameter.

In some examples of the method, first network nodes, apparatuses, and non-transitory computer-readable medium described herein, communicating with the second network node based on the signature parameter may include operations, features, means, or instructions for using the signature parameter in communications with the second network node during a period of time.

In some examples of the method, first network nodes, apparatuses, and non-transitory computer-readable medium described herein, communicating with the second network node based on the signature parameter may include operations, features, means, or instructions for determining, after the period of time, a second signature parameter for second communications with the second network node during a second period of time.

In some examples of the method, first network nodes, apparatuses, and non-transitory computer-readable medium described herein, the signature parameter may be based on the third phase and the second phase.

Some examples of the method, first network node, apparatuses, and non-transitory computer-readable medium described herein may further include operations, features, means, or instructions for receiving, via a layer three signal, the authentication parameter before transmission of the second signal.

In some examples of the method, first network nodes, apparatuses, and non-transitory computer-readable medium described herein, receiving the authentication parameter via the layer three signal may include operations, features, means, or instructions for receiving the layer three signal from the second network node.

Some examples of the method, first network node, apparatuses, and non-transitory computer-readable medium described herein may further include operations, features, means, or instructions for determining, based on error correction information conveyed via the third signal, that the signature parameter may be incorrect, where communicating with the second network node based on the signature parameter includes transmitting a negative acknowledgement to the second network node indicative of that the signature parameter may be incorrect.

In some examples of the method, first network nodes, apparatuses, and non-transitory computer-readable medium described herein, determining, based on the error correction information, that the signature parameter may be incorrect may include operations, features, means, or instructions for comparing the first cyclic redundancy check information to expected cyclic redundancy check information.

Some examples of the method, first network node, apparatuses, and non-transitory computer-readable medium described herein may further include operations, features, means, or instructions for determining, based on error correction information conveyed via the third signal, that the signature parameter may be correct, where communicating with the second network node based on the signature parameter includes refraining from transmission of a negative acknowledgement to the second network node indicative of an incorrect signature parameter.

Some examples of the method, first network node, apparatuses, and non-transitory computer-readable medium described herein may further include operations, features, means, or instructions for determining a phase error threshold and a phase error level of a channel via which the first signal, the second signal, and the third signal may be communicated and determining the signature parameter based on the phase error level being less than the phase error threshold.

In some examples of the method, first network nodes, apparatuses, and non-transitory computer-readable medium described herein, the first signal includes an authentication request, the second signal includes a configuration request and authentication response, and the third signal includes a configuration response.

In some examples of the method, first network nodes, apparatuses, and non-transitory computer-readable medium described herein, the first signal conveys a request for a prior signature parameter and the authentication parameter includes the prior signature parameter.

In some examples of the method, first network nodes, apparatuses, and non-transitory computer-readable medium described herein, the first signal may be received, the second signal may be transmitted, and the third signal may be received within a time period that may be less than a channel coherence time period.

A method for wireless communications at a first network node is described. The method may include transmitting a first signal conveying a first phase, receiving, from a second network node, a second signal conveying a second phase, determining that the second phase is based on the first phase and an authentication parameter common to the first network node and the second network node, transmitting, based on the determination, a third signal conveying a third phase to the second network node, where the third phase is indicative of a signature parameter, and communicating with the second network node based on the signature parameter.

A first network node for wireless communications is described. The first network node may include a memory and at least one processor coupled to the memory. The at least one processor may be configured to transmit a first signal conveying a first phase, receive, from a second network node, a second signal conveying a second phase, determine that the second phase is based on the first phase and an authentication parameter common to the first network node and the second network node, transmit, based on the determination, a third signal conveying a third phase to the second network node, where the third phase is indicative of a signature parameter, and communicate with the second network node based on the signature parameter.

Another apparatus for wireless communications at a first network node is described. The apparatus may include means for transmitting a first signal conveying a first phase, means for receiving, from a second network node, a second signal conveying a second phase, means for determining that the second phase is based on the first phase and an authentication parameter common to the first network node and the second network node, means for transmitting, based on the determination, a third signal conveying a third phase to the second network node, where the third phase is indicative of a signature parameter, and means for communicating with the second network node based on the signature parameter.

A non-transitory computer-readable medium having code for wireless communication stored thereon is described. The code when executed by a first network node, causes the first network node to transmit a first signal conveying a first phase, receive, from a second network node, a second signal conveying a second phase, determine that the second phase is based on the first phase and an authentication parameter common to the first network node and the second network node, transmit, based on the determination, a third signal conveying a third phase to the second network node, where the third phase is indicative of a signature parameter, and communicate with the second network node based on the signature parameter.

In some examples of the method, first network nodes, apparatuses, and non-transitory computer-readable medium described herein, communicating with the second network node based on the signature parameter may include operations, features, means, or instructions for transmitting, to the second network node, a data signal encoded based on the signature parameter.

In some examples of the method, first network nodes, apparatuses, and non-transitory computer-readable medium described herein, communicating with the second network node based on the signature parameter may include operations, features, means, or instructions for using the signature parameter in communications with the second network node during a period of time.

In some examples of the method, first network nodes, apparatuses, and non-transitory computer-readable medium described herein, communicating with the second network node based on the signature parameter may include operations, features, means, or instructions for determining, after the period of time, a second signature parameter for second communications with the second network node during a second period of time.

In some examples of the method, first network nodes, apparatuses, and non-transitory computer-readable medium described herein, determining that the second phase may be based on the authentication parameter may include operations, features, means, or instructions for determining that the second phase may be within a threshold of an expected second phase.

In some examples of the method, first network nodes, apparatuses, and non-transitory computer-readable medium described herein, the third phase may be based on the second phase and the signature parameter.

Some examples of the method, first network node, apparatuses, and non-transitory computer-readable medium described herein may further include operations, features, means, or instructions for receiving, from a third network node, a fourth signal conveying a fourth phase, determining a second authentication parameter associated with the third network node based on the fourth phase and the first phase, and determining that the second authentication parameter may be not within a threshold of an expected authentication parameter.

Some examples of the method, first network node, apparatuses, and non-transitory computer-readable medium described herein may further include operations, features, means, or instructions for transmitting, to the second network node, the authentication parameter via a layer three signal before reception of the second signal.

Some examples of the method, first network node, apparatuses, and non-transitory computer-readable medium described herein may further include operations, features, means, or instructions for receiving the authentication parameter before reception of the second signal and via a layer three signal.

In some examples of the method, first network nodes, apparatuses, and non-transitory computer-readable medium described herein, randomly determining the first phase.

Some examples of the method, first network node, apparatuses, and non-transitory computer-readable medium described herein may further include operations, features, means, or instructions for transmitting, with the third signal, error correction information, where communicating with the second network node based on the signature parameter includes receiving a negative acknowledgement from the second network node corresponding to the signature parameter.

Some examples of the method, first network node, apparatuses, and non-transitory computer-readable medium described herein may further include operations, features, means, or instructions for determining a phase error threshold and a phase error level of a channel via which the first signal, the second signal, and the third signal may be communicated and determining the authentication parameter based on the phase error level being less than the phase error threshold.

In some examples of the method, first network nodes, apparatuses, and non-transitory computer-readable medium described herein, the first signal includes an authentication request, the second signal includes a configuration request and authentication response, and the third signal includes a configuration response.

In some examples of the method, first network nodes, apparatuses, and non-transitory computer-readable medium described herein, the first signal conveys a request for a prior signature parameter and the authentication parameter includes the prior signature parameter.

Some examples of the method, first network node, apparatuses, and non-transitory computer-readable medium described herein may further include operations, features, means, or instructions for applying an authentication test to the authentication parameter, and where transmitting the third signal based on the authentication test.

In some examples of the method, first network nodes, apparatuses, and non-transitory computer-readable medium described herein, the authentication test includes one of a distribution-based hypothesis test or a hamming-distance-based similarity test.

Some examples of the method, first network node, apparatuses, and non-transitory computer-readable medium described herein may further include operations, features, means, or instructions for determining that the authentication parameter may be authentic, where transmitting the third signal may be based on the determination that the authentication parameter may be authentic.

In some examples of the method, first network nodes, apparatuses, and non-transitory computer-readable medium described herein, reception of the first signal, transmission of the second signal, and reception of the third signal occur within a period of time less than a channel coherence time period.

DETAILED DESCRIPTION

Figure 1:
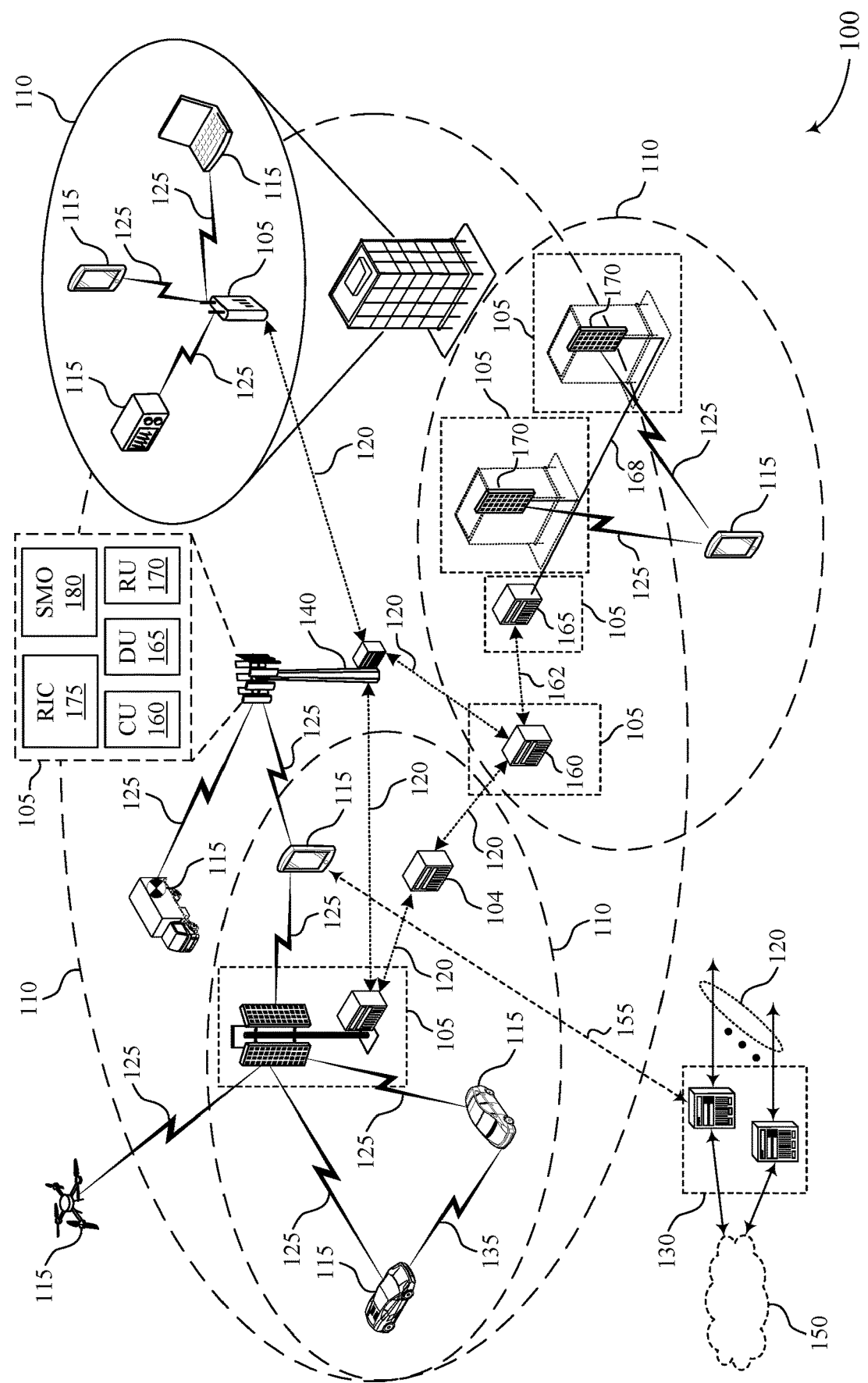
FIG. 1 illustrates an example of a wireless communications system that supports secure configuration sharing over reference signals in accordance with one or more aspects of the present disclosure.

User privacy and data confidentiality may be an important consideration for secure and reliable transmission protocols. Accordingly, in some wireless communications systems, wireless devices may utilize one or more upper-layer cryptographic techniques to increase confidentiality and integrity of data transmissions. For example, a first network node (e.g., a transmitting device) may introduce artificial impairments into physical layer (PHY) transmissions in order to prevent an unauthenticated device from extracting data from the PHY transmissions. The first network node may indicate, to a second network node (e.g., the receiving device), a PHY configuration parameter that indicates artificial PHY impairments on PHY transmissions transmitted by the first network node. The second network node may use the PHY configuration parameter to extract data from PHY transmissions. One way to indicate the PHY configuration parameter is over a PHY reference signal. Additionally, reference signals may be used to perform communications systems functionalities (e.g., channel estimation and positioning). Existing upper layer cryptographic algorithms, however, may be unsuitable for PHY reference signals, which may be transmitted before a radio resource control (RRC) connection is established between the first network node and the second network node, as upper layer cryptographic algorithms may be implemented in upper layers after an RRC connection is established. Additionally, currently, there are no security protections for reference signals, which may make transmissions over reference signals vulnerable to malicious attacks and may impair the reliability of subsequent communications functions.

The present disclosure relates to reliable and secure techniques for sharing configuration parameters over PHY reference signals between a first network node (e.g., a transmitting device) and a second network node (e.g., a receiving device). The disclosed techniques may make use of the reciprocity of the underlying communication channel between two wireless devices. A first network node and a second network node may both be configured with an authentication parameter $\beta$. The first network node may transmit a first signal (e.g., an authentication request signal) to the second network node. The authentication request signal may convey a first phase $\psi$. In some aspects, the first network node may select a new phase each time it transmits an authentication request signal. Due to propagation over the channel ($\omega_{T \to R}$) between the first network node and the second network node, the phase response $\lambda$ of the authentication request signal received at second network node may be represented as $\omega + \omega_{T \to R}$. The second network node may prepare a second signal in response to the authentication request signal (e.g., an authentication response signal) using the phase response $\lambda$ and the authentication parameter $\beta$. For example, the second network node may transmit an authentication response signal conveying a phase $\varphi$, where $\varphi = \beta - \lambda$. The phase response $\theta$ of the authentication response signal received at the second device may be represented by $\theta = \varphi + \omega_{R \to T}$. Because of channel reciprocity (e.g $(\omega_{R \to T} \approx \omega_{T \to R})$), the phase response $\theta$ may be approximated by the difference between the authentication parameter $\beta$ and the first phase $\psi$, as in $\theta \approx \beta - \psi$.

Accordingly, the first network node may determine whether the second network node transmitted the configured authentication parameter $\beta$ in the authentication response message. If the second network node transmits the configured authentication parameter $\beta$ in the authentication response message, the first network node may determine that the second network node is an authenticated device. In response to determining that the second network node is an authenticated device, the first network node may transmit a third signal (e.g., a configuration response message) that indicates a PHY signature parameter $\phi$. For example, the configuration response message may convey a phase $\phi - \hat{\theta}$. The phase response of the configuration response message received at the first device may be represented by $\phi - \hat{\theta} + \omega_{T \to R}$. Because of channel reciprocity (e.g $(\omega_{R \to T} \approx \psi_{T \to R})$), the phase response of the configuration response message received at the first device may be approximated by a difference between the PHY signature parameter $\phi$ and the phase $\varphi$, given as $\phi - \hat{\theta} + \omega_{T \to R} \approx \phi - \varphi$. Because the second network node knows the phase $\varphi$ (which the second network node conveyed in the authentication response message), the second network node may extract the signature parameter $\phi$. The second network node may use the signature parameter $\phi$ to extract data from future PHY transmissions that include artificial impairments corresponding to the signature parameter $\phi$.

As the authentication procedure may depend on channel reciprocity, even if another device intercepts the configuration response message, the intercepting device will be unable to extract the signature parameter $\phi$ because channel reciprocity will not hold unless the channel between the intercepting device and the first network node are the same as the channel between the second network node and the first network node (which may not practically occur unless the intercepting device is at the same physical position as the second network node). Accordingly, the disclosed technique may be referred to as PHY-secure.

Aspects of the disclosure are initially described in the context of wireless communications systems. Aspects of the disclosure are further illustrated by and described with reference to process flows, apparatus diagrams, system diagrams, and flowcharts that relate to secure configuration sharing over reference signals.

FIG. 1 illustrates an example of a wireless communications system 100 that supports secure configuration sharing over reference signals in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

1. As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhaul (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an IAB network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., PHY) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support secure configuration sharing over reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

User privacy and data confidentiality may be an important consideration for secure and reliable transmission protocols. Accordingly, in some aspects of the wireless communications system 100, wireless devices (e.g., UEs 115 or network entities 105) may utilize one or more upper-layer cryptographic techniques to increase confidentiality and integrity of data transmissions. For example, a first network node (e.g., a transmitting device) may introduce artificial impairments into PHY transmissions in order to prevent an unauthenticated device from extracting data from the PHY transmission. The first network node may indicate, to a second network node (e.g., the receiving device), a PHY configuration parameter that indicates artificial PHY impairments on PHY transmissions transmitted by the first network node. For example, a first network node (e.g., a transmitting device) may transmit to a second network node (e.g., a receiving device), via a PHY reference signal, an indication of a PHY configuration parameter configuration that a second network node may use to remove artificial PHY impairments in order to process a future data block. The first network node, for example, may be a first UE 115 in sidelink communications, a UE 115 in uplink communications, or a network entity 105 in downlink communications. The second network node, for example, may be a second UE 115 in sidelink communications, a network entity 105 in uplink communications, or a UE 115 in downlink communications.

The PHY configuration parameter may be transmitted via PHY reference signals from the first network node to the second network node securely and in an authenticated manner in order to avoid compromising the reliability of subsequent communications functions. As PHY links do not include encryption, the content of the reference signals (e.g., the configuration of the artificial impairment) should be protected directly in PHY such that an eavesdropper or adversary device cannot learn the configurations. The first network node should transmit the PHY reference signals conveying the configurations (e.g., the configuration of the artificial impairment) to the legitimate receiving devices (e.g., not to eavesdropper devices) such that any adversarial attack attempting to learn the configuration from the reference signals will be unsuccessful. Implementing such an authentication of the PHY reference signals at the same time (e.g., within a same OFDM symbol) as transmission of the PHY reference signal conveying the configuration parameter may result in coverage issues in power-limited scenarios (e.g., for uplink reference signals). Authenticating the PHY reference signals in a separate occasion (e.g., a later OFDM symbol) than transmission of the reference signals conveying the configuration parameter may resolve coverage issues, but at the expense of carrying an authentication context from the authentication occasion (e.g., symbol) to the PHY reference signal occasion (e.g., symbol).

In some aspects, network nodes of the wireless communications system 100 may utilize techniques for reliable and secure sharing of configuration parameters over reference signals. The network nodes may use techniques that provide for joint authentication and PHY secure transmission for configuration sharing over reference signals over PHY links which implement authentication and PHY reference signal transmission in separate time occasions, and bridge the two via conveying authentication context from one occasion to another. The configuration parameters may be transmitted via a phase-modulated response signal (e.g., a reference signal) which carries each phase value with a difference from the output of the channel as a response to a prior request signal. Transmission via phase difference may be referred to as PHY-secure, as adversary or eavesdropping devices cannot learn the configuration by capturing or intercepting a reference signal conveying the configuration, as the transmission via phase difference relies on channel reciprocity between a transmitting device (e.g., the first network node) and a receiving device (e.g., a second network node). To prevent any active adversary from impersonating a legitimate network node and transmitting a request signal in order to lean the configuration, the first network node (e.g., the transmitting device) may respond only to authenticated request signals (e.g., request signals carrying valid credentials). An authentication procedure may involve separate request and response parts (e.g., as for a configuration transmission), where the credentials (e.g., a PHY configuration parameter or a PHY signature parameter) are conveyed during the response part in a PHY-secure manner (e.g., via phase difference). To convey the authentication context to the configuration transmission occasion, the response of the authentication and request of the configuration transmission may be merged and implemented simultaneously.

For example, a first network node may transmit a first signal conveying a first phase to a second network node. The second network node may transmit, to the first network node, a second signal conveying a second phase, where the second phase is based on the first phase and an authentication parameter common to the first network node and the second network node. The second signal may correspond to a response to an authentication and a request of a configuration transmission. The first network node may determine, based on the channel coherency, that the second phase is based on the first phase and the authentication parameter. Accordingly, the first network node may authenticate the second network node. Based on determining that the second phase is based on the authentication parameter, the first network node may transmit a third signal conveying a third phase to the second network node, where the third phase indicates a signature parameter (e.g., a PHY configuration parameter or a PHY signature parameter). Based on the second phase, the second network node may extract the signature parameter from the third phase. The first network node and the second network node may communicate based on the signature parameter. For example, the first network node may encode data signals using the signature parameter, and the second network node may decode data signals using the signature parameter. As the authentication procedure may depend on channel reciprocity, even if another device intercepts the configuration response message, the intercepting device will be unable to extract the signature parameter because channel reciprocity will not hold unless the channel between the intercepting device and the first network node are the same as the channel between the second network node and the first network node (which may not practically occur unless the intercepting device is at the same physical position as the second network node). Accordingly, such techniques may be referred to as PHY-secure.

Figure 2:
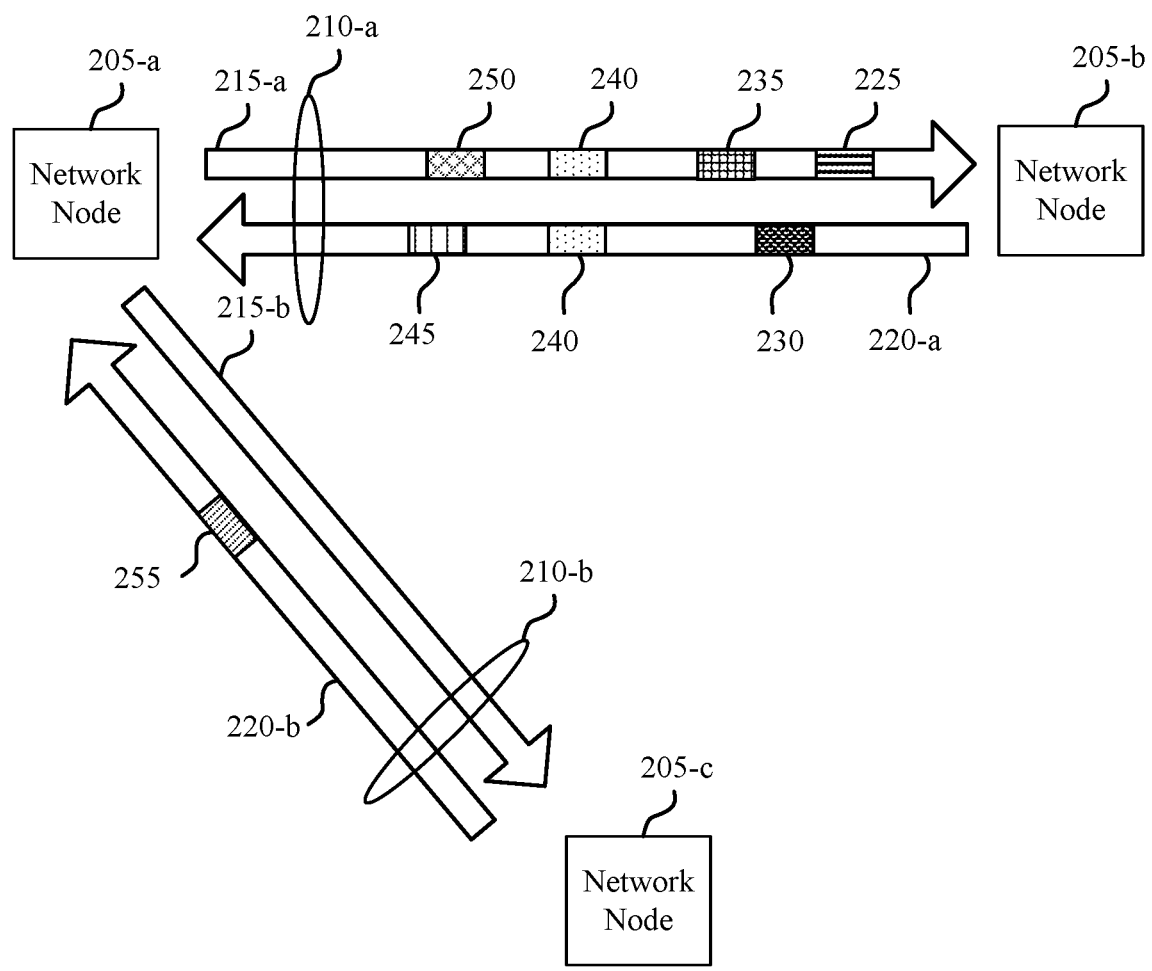
FIG. 2 illustrates an example of a process flow that supports secure configuration sharing over reference signals in accordance with one or more aspects of the present disclosure.

FIG. 2 illustrates an example of a wireless communications system 200 that supports secure configuration sharing over reference signals in accordance with one or more aspects of the present disclosure. In some aspects, the wireless communications system 200 may implement aspects of wireless communications system 100. For example, the first network node 205-*a*, the second network node 205-*b*, and the third network node 205-*c* may be a UE 115 or a network entity 105 as described herein.

The first network node 205-*a* may communicate with the second network node 205-*b* using a communication link 210-*a*. The first network node 205-*a* may communicate with the third network node 205-*c* using a communication link 210-*b*. In some aspects, the communication link 210-*a* and the communication link 210-*b* may be examples of NR or LTE links 125 (e.g., the first network node 205-*a* may be a network entity 105 as described herein and the second network node 205-*b* and the third network node 205-*c* may be UEs 115 as described herein). In some cases, the communication link 210-*a* and the communication link 210-*b* may be examples of D2D communication links 135 (e.g., the first network node 205-*a*, the second network node 205-*b*, and the third network node 205-*c* may be UEs 115 as described herein). The communication link 210-*a* may include a bidirectional link. For example, the first network node 205-*a* may transmit signals via a first channel 215-*a* to the second network node 205-*b* and the second network node 205-*b* may transmit signals via a second channel 220-*a* to the first network node 205-*a*. The communication link 210-*b* may include a bidirectional link. For example, the first network node 205-*a* may transmit signals via a third channel 215-*b* to the third network node 205-*c* and the third network node 205-*c* may transmit signals via a fourth channel 220-*b* to the first network node 205-*a*.

The first network node 205-*a* may transmit a first signal 225 (e.g., an authentication request) to the second network node 205-*b* conveying a first phase. The first phase may be a random phase $\psi$. The first phase $\psi$ may be transparent to the second network node 205-*b* (and any device other than the first network node 205-*a*). In some cases, a new phase value may be selected each time a new authentication request is transmitted by the first network node 205-*a*, to prevent any adversary device from recording the authentication response to deceive the first network node 205-*a* at a later time). For example, selecting a new phase value each time a new authentication request is transmitted by the first network node 205-*a* may prevent replay attacks by adversary devices. In some cases, the first network node 205-*a* may use a different beam each time the first network node 205-*a* transmits a new authentication request, which new beam may be selected randomly (e.g., to prevent replay attacks).

The phase response $\lambda$ of the first channel 215-*a* for the first signal 225 may be given as $\lambda=\psi+\omega_{T \rightarrow R}$ where $\omega_{T \rightarrow R}$ refers to the phase rotation due to the radio frequency front-end and propagation over the first channel 215-*a*, and the second network node 205-*b* measures the first phase of the first signal 225 as $\hat{\lambda}$.

The second network node 205-*b* may prepare the authentication response that includes the phase value $\varphi=\beta-\hat{\lambda}$ where $\beta$ is the phase-modulated authentication parameter (e.g., credential) known by both the first network node 205-*a* and the second network node 205-*b*. For example, the network (e.g., a network entity 105) may share the authentication parameter with the first network node 205-*a* and the second network node 205-*b*. In some cases, the first network node 205-*a* may transmit a layer 3 message 250 (e.g., an RRC message) indicating the authentication parameter to the second network node 205-*b*. The second network node 205-*b* may transmit a second signal 230 (e.g., an authentication response and configuration request) conveying the phase value $\varphi$ to the first network node 205-*a*. Even if the third network node 205-*c*, which may be an adversary or eavesdropper, measures the transmitted phase $\varphi$)=$\beta-\hat{\lambda}$, the third network node 205-*c* cannot learn the phase $\beta$ that represents the authentication parameter since the third network node 205-*c* does not know $\hat{\lambda}$, which is the value of the first phase of the first signal 225 measured at the second network node 205-*b* and depends on the first channel 215-*a*. Accordingly, the authentication response may be referred to as PHY secure.

The phase $\theta$ of the second signal 230 received at the first network node 205-*a* may be given as $\varphi=\varphi+\omega_{R\rightarrow T}$. Given channel reciprocity between the first channel 215-*a* and the second channel 220-*a* (e.g., given that $\omega_{R\rightarrow T}\approx\omega_{T\rightarrow R}$), and that $\varphi=\beta-\hat{\lambda}$, then $\theta=\varphi+\omega_{R\rightarrow T}=\beta-\psi$. Accordingly, the first network node 205-*a* measures the received phase $\hat{\theta}$ of the second signal 230 as $\hat{\theta}\approx\beta-\psi$, and since the initial (random) phase $\psi$ of the first signal 225 is known by the first network node 205-*a*, the phase value $\beta$ representing the authentication parameter common to the first network node 205-*a* and the second network node 205-*b* may be extracted by the first network node 205-*a* from the phase of the second signal 230. In some cases, the first network node 205-*a* may perform an authentication test (e.g., a distribution-based hypothesis test or a hamming-distance based similarity test) to determine whether the authentication parameter received via the second signal 230 matches an expected authentication parameter.

If the first network node 205-*a* determines that the authentication parameter received via the second signal 230 matches an expected authentication parameter, the first network node 205-*a* may transmit a third signal 235 that indicates a signature parameter for communications between the first network node 205-*a* and the second network node 205-*b*. If the first network node 205-*a* determines that the authentication parameter received via the second signal 230 does not match an expected authentication parameter, the first network node 205-*a* may refrain from indicating the signature parameter to the second network node 205-*b*.

For example, if an adversary device, such as the third network node 205-*c*, transmits an authentication response signal 255, the authentication response signal 255 would not include the correct authentication parameter $\beta$. Further, even if the third network node 205-*c* did obtain the authentication parameter $\beta$, the first network node 205-*a* would be able to identify that the third network node 205-*c* is an adversary device because the $\hat{\lambda}$ in the authentication response signal 255 would not match the expected $\hat{\lambda}$ unless the fourth channel 220-*b* was coherent with the first channel 215-*a*, which would not be the case unless the second network node 205-*b* was at a same physical location as the third network node 205-*c*.

If the authentication procedure is successful (e.g., if the first network node 205-*a* determines that the authentication parameter received via the second signal 230 matches an expected authentication parameter), the first network node 205-*a* may transmit the signature parameter via the third signal 235 in a PHY-secure manner (e.g., via phase difference). Accordingly, the first network node 205-*a* may treat the second signal 230 as both an authentication response and as a configuration request, and may the first network node 205-*a* may prepare the third signal (e.g., the configuration response) to include the configuration (e.g., the signature parameter) represented by a phase modulated parameter $\phi$.

The third signal 235 may convey a third phase value $\varphi-\hat{\theta}$ where $\hat{\theta}$ is the phase estimate of the channel output for the second signal 230 (e.g., the authentication response or the configuration request). Even if the phase $\phi-\hat{\theta}$ is measured by any adversary device (such as the third network node 205-*c*), the adversary device cannot learn the phase $\phi$, and therefore the confidential configuration data $\phi$, as the adversary device does not know $\hat{\theta}$. Accordingly, the configuration response may be referred to as PHY secure. The phase of the third signal 235 received at the second network node 205-*b* may be given as $\phi-\hat{\theta}+\omega_{T\rightarrow R}$. Given channel reciprocity between the first channel 215-*a* and the second channel 220-*a* (e.g., given that $\omega_{R\rightarrow T}\approx\omega_{T\rightarrow R}$) and that $\theta=\varphi+\omega_{R\rightarrow T}$, accordingly $\phi-\hat{\theta}\approx\phi-\varphi$. The estimate of the residual phase $\phi-\varphi$ of the third signal 235 may be used by the second network node 205-*b* to learn the configuration via the signature parameter $\phi$, since $\varphi$ is already available to the second network node 205-*b*, since $\varphi$ is constructed as $\varphi=\beta-\hat{\lambda}$ A while the second signal 230 (the authentication response) is generated. The signature parameter $\phi$ may accordingly be used for secure communications 240 between the first network node 205-*a* and the second network node 205-*b*. Given that the PHY-secure sharing procedure (e.g., transmission of the first signal 225, the second signal 230, and the third signal 235) relies on channel reciprocity, the overall procedure may be completed within a channel coherence time (e.g., a channel coherence time of the first channel 215-*a* and the second channel 220-*a*).

The phase parameters $\beta$ and $\phi$ may be multiple-bits long, and accordingly multiple tones may be used in the frequency domain to transmit the phase parameters $\beta$ and $\phi$ over the second signal 230 and the third signal 235, respectively.

In some cases, the first network node 205-*a* may include error correction information in the third signal 235. The second network node 205-*b* may determine, based on the error correction information, whether the signature parameter $\phi$ conveyed via the third signal 235 is correct. If the second network node 205-*b* determines that the signature parameter $\phi$ is not accurate, the second network node 205-*b* may transmit a negative acknowledgement (NACK) 245 to the first network node 205-*a*. If the second network node 205-*b* determines that the signature parameter $\phi$ is accurate, the second network node 205-*b* may refrain from transmitting a NACK to the first network node 205-*a*. For example, the error correction information may be CRC information associated with (e.g., CRC bits appended to) the signature parameter $\phi$. The second network node 205-*b* may determine the accuracy of the signature parameter $\phi$ (e.g., whether the signature parameter $\phi$ is correct) based on comparing the received CRC information to expected CRC information. For example, if CRC bits appended to the signature parameter $\phi$ do not match expected CRC bits, the second network node 205-*b* may determine that the signature parameter $\phi$ is inaccurate. If CRC bits appended to the signature parameter $\phi$ match expected CRC bits, the second network node 205-*b* may determine that the signature parameter $\phi$ is accurate. In some cases, if the first network node 205-*a* receives the NACK 245, the first network node 205-*a* may reshare the signature parameter by repeating the procedure (e.g., transmission of the first signal 225, the second signal 230, and the third signal 235). In some cases, if the first network node 205-*a* receives the NACK 245, the first network node 205-*a* may suspend sharing of the signature parameter with the second network node 205-*b* (e.g., via transmission of the first signal 225, the second signal 230, and the third signal 235) for a defined period of time. If the first network node 205-*a* does not receive a NACK 245, the first network node 205-*a* may assume that the second network node 205-*b* successfully learned the signature parameter ϕ.

PHY-secure transmission may prevent the exposure of transmitted data (e.g., the secret configuration parameter β or the secret signature parameter ϕ) to unauthorized devices.

Due to channel reciprocity imperfections (e.g., radio frequency front-end calibration errors between the request and response parts) and error in estimating channel phase responses, the measured the measured β–ψ for the second signal 230 (e.g., the authentication response) or the measured ϕ–φ for the third signal (e.g., the configuration response) may deviate from the actual values. Accordingly, the first network node 205-*a* and the second network node 205-*b* may periodically exchange a known phase parameter β or ϕ to quantify the error between received and expected values of β–ψ and ϕ–φ (since ψ and φ are known to the first network node 205-*a* and the second network node 205-*b*, respectively). In some cases, the network (e.g., a network entity) may dynamically or statically set thresholds for the error associated with β–ψ and ϕ–φ in accordance with the transmission of data which may be known or not known by the second network node 205-*b*. If error measurements for β–ψ and ϕ–φ are below respective error thresholds, then the PHY-secure configuration sharing procedure (e.g., transmission of the first signal 225, the second signal 230, and the third signal 235) may proceed. If error measurements for β–ψ and ϕ–φ are below respective error thresholds, then the PHY-secure configuration sharing procedure (e.g., transmission of the first signal 225, the second signal 230, and the third signal 235) may be suspended, for example until measurements of the error for β–ψ and ϕ–φ are below respective error thresholds.

In some aspects, if a prior signature parameter (e.g., one or more artificial PHY signature parameters) is available to use for transmission between the first network node 205-*a* and the second network node 205-*b*, the first network node 205-*a* may select to carry out an authentication procedure using the available prior signature parameter. For example, the first network node 205-*a* may request a valid signature parameter in the first signal 225 (e.g., the authentication request). The second signal 230 (e.g., the authentication response and configuration request) may then include a random phase φ, and the second network node 205-*b* may convey one of the prior signature parameters on top of the random phase φ. The signature parameter may be selected by the first network node 205-*a* via sending an index corresponding to the signature parameter via the first signal 225. The first network node 205-*a* may verify the identity of the second network node 205-*b* via checking the received signature parameter.

Figure 3:
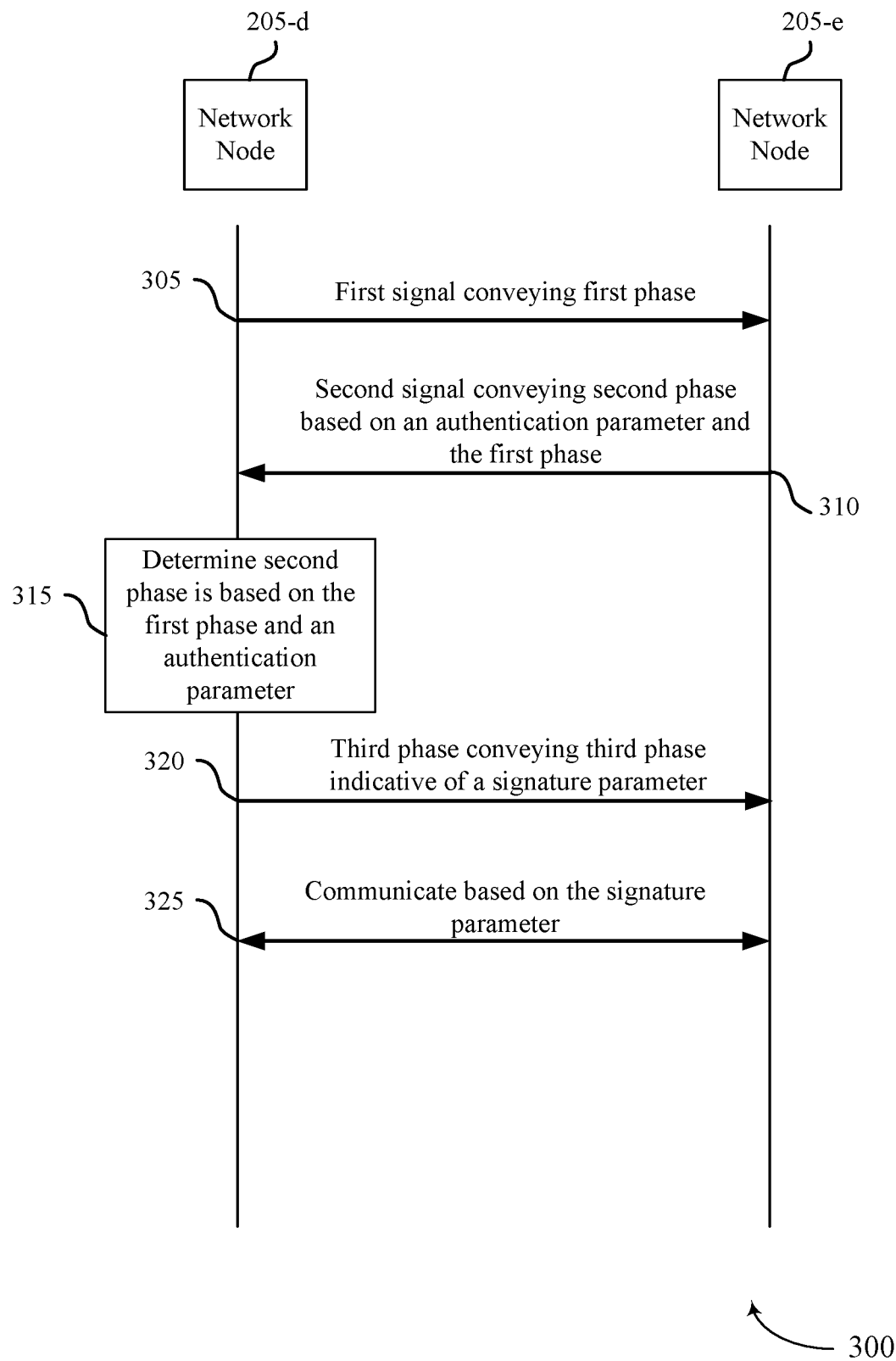
FIG. 3 illustrates an example of a wireless communications system that supports secure configuration sharing over reference signals in accordance with one or more aspects of the present disclosure.

FIG. 3 illustrates an example of a process flow 300 that supports secure configuration sharing over reference signals in accordance with one or more aspects of the present disclosure. The process flow 300 may include a first network node 205-*d* and a second network node 205-*e*. In the following description of the process flow 300, the operations between the first network node 205-*d* and the second network node 205-*e* may be transmitted in a different order than the example order shown, or the operations performed by the first network node 205-*d* and the second network node 205-*e* may be performed in different orders or at different times. Some operations may also be omitted from the process flow 300, and other operations may be added to the process flow 300.

At 305, the first network node 205-*d* may transmit, and the second network node 205-*e* may receive, first signal conveying a first phase. In some cases, the first network node 205-*d* may randomly determine the first phase.

At 310, the second network node 205-*e* may transmit, and the first network node 205-*d* may receive, a second signal conveying a second phase. The second phase may be based on the first phase and an authentication parameter common to the first network node 205-*d* and the second network node 205-*e*.

At 315, the first network node 205-*d* may determine that the second phase is based on the first phase and an authentication parameter common to the first network node 205-*d* and the second network node 205-*e*.

In some cases, the first network node 205-*d* or the second network node 205-*e* may receive an indication of the authentication parameter (for example, via a layer 3 signal) before the transmission of the second signal at 310. In some cases, the first network node 205-*d* may transmit an indication of the of the authentication parameter (for example, via a layer 3 signal) to the second network node 205-*e*.

In some cases, determining that the second phase is based on the authentication parameter includes determining that the second phase is within a threshold of an expected second phase.

At 320, the first network node 205-*d* may transmit, based on the determination at 315, and the second network node 205-*e* may receive, a third signal conveying a third phase, where the third phase is indicative of a signature parameter.

In some cases, the third phase is based on the second phase and the signature parameter. In some cases, the signature parameter may be determined at the second network node 205-*e* based on the third phase and the second phase.

At 325, the first network node 205-*d* and the second network node 205-*e* may communicate based on the signature parameter.

In some cases, communicating based on the signature parameter may include transmitting, from the first network node 205-*d* to the second network node 205-*e*, a data signal encoded based on the signature parameter. The second network node 205-*e* may decode the data signal based on the signature parameter.

In some cases, communicating based on the signature parameter may include using the signature parameter in communications between the first network node 205-*d* and the second network node 205-*e* during a period of time. In some cases, communicating based on the signature parameter may include determining, after the period of time, a second signature parameter (e.g., by repeating steps 305 through 320) for second communications between the first network node 205-*d* and the second network node 205-*e* during a second period of time.

In some cases, the second network node 205-*e* may determine, based on error correction information conveyed via the third signal at 320, that the signature parameter is incorrect, and communicating with the first network node 205-*d* based on the signature parameter includes transmitting a NACK to the first network node 205-*d* indicative of that the signature parameter is incorrect. In some cases, the error correction information includes first CRC information associated with the signature parameter, and determining, based on the error correction information, that the signature parameter is incorrect includes comparing the first cyclic redundancy check information to expected cyclic redundancy check information. In some cases, the second network node 205-*e* may determine, based on error correction information conveyed via the third signal at 320, that the signature parameter is correct, and communicating with the first network node 205-*d* based on the signature parameter includes refraining from transmitting a NACK to the first network node 205-*d*. In some cases, the error correction information includes first CRC information associated with the signature parameter, and determining, based on the error correction information, that the signature parameter is correct includes comparing the first cyclic redundancy check information to expected cyclic redundancy check information.

In some cases, the second network node 205-*e* may determine a phase error threshold and a phase error level of a channel via which the first signal, the second signal, and the third signal are communicated, and the second network node 205-*e* may determine the signature parameter based on the phase error level being less than the phase error threshold.

In some cases, the first network node 205-*d* may determine a phase error threshold and a phase error level of a channel via which the first signal, the second signal, and the third signal are communicated, and the first network node 205-*d* may determine the authentication parameter based on the phase error level being less than the phase error threshold.

In some cases, the first network node 205-*d* may apply an authentication test to the authentication parameter received via the second signal, and the first network node 205-*d* transmits the third signal based on the authentication test. In some cases, the authentication test may be one of a distribution-based hypothesis test or a hamming-distance-based similarity test.

In some cases, the first network node 205-*d* may determine that the authentication parameter received via the second signal is authentic, and transmitting the third signal is based on the determination that the authentication parameter received via the second signal is authentic.

In some cases, the first signal may be an authentication request, the second signal may be a configuration request and authentication response, and the third signal may be a configuration response.

In some cases, the first signal conveys a request for a prior signature parameter, and the authentication parameter may be the prior signature parameter.

In some cases, the first signal, the second signal, and the third signal are transmitted within a time period that is less than a channel coherence time period.

In some cases, the first network node 205-*d* may receive from a third network node, a fourth signal conveying a fourth phase. The first network node 205-*d* may determine a second authentication parameter associated with the third network node based on the fourth phase and the first phase. The first network node 205-*d* may determine that the second authentication parameter is not within a threshold of an expected authentication parameter. Accordingly, the first network node 205-*d* may not transmit a signal to the third network node indicative of the signature parameter.

Figure 4:
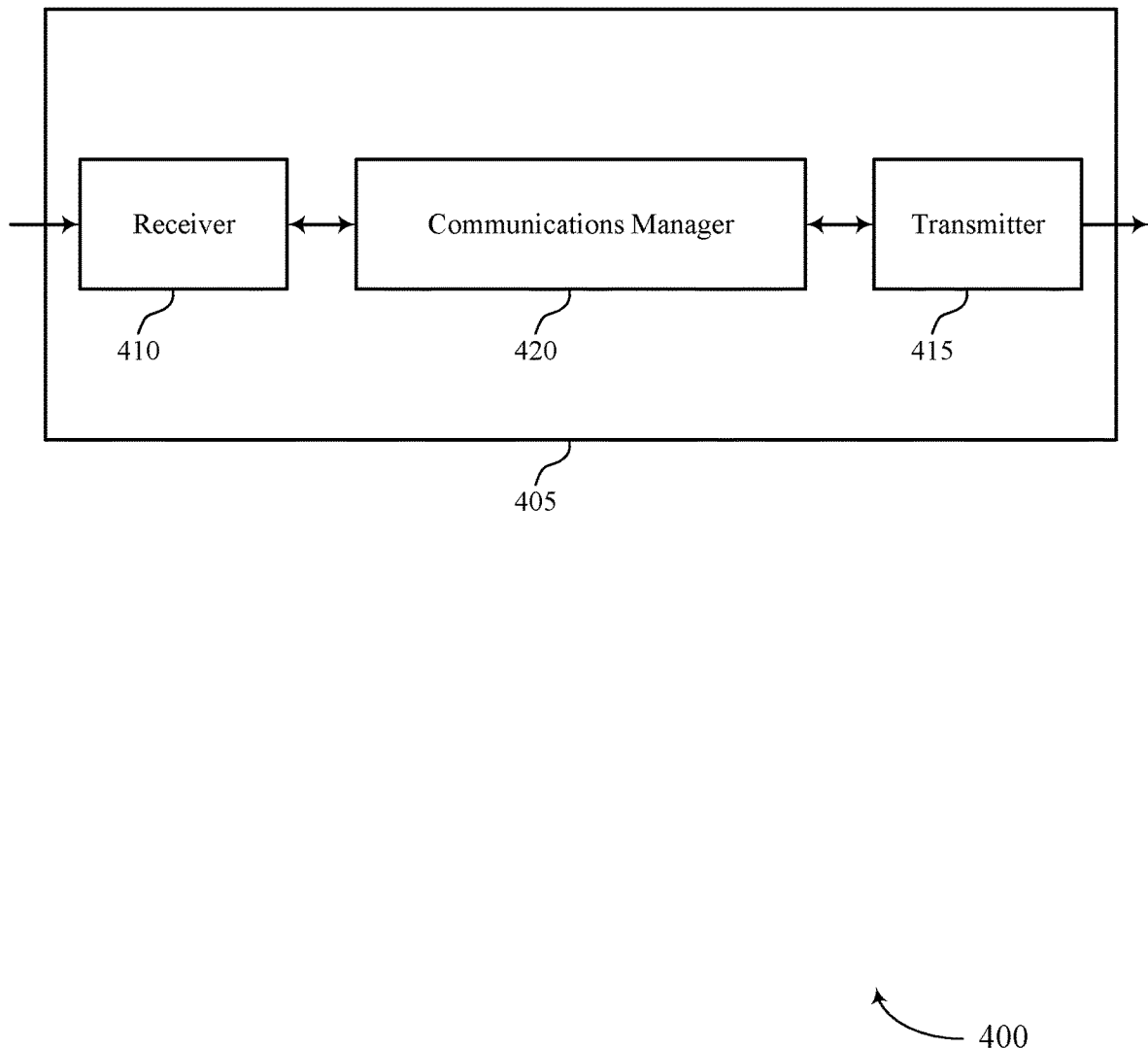
FIGS. 4 and 5 show block diagrams of devices that support secure configuration sharing over reference signals in accordance with one or more aspects of the present disclosure.

FIG. 4 shows a block diagram 400 of a device 405 that supports secure configuration sharing over reference signals in accordance with one or more aspects of the present disclosure. The device 405 may be an example of aspects of a UE 115 or a network entity 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to secure configuration sharing over reference signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to secure configuration sharing over reference signals). In some aspects, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of secure configuration sharing over reference signals as described herein. For example, the communications manager 420, the receiver 410, the transmitter 415, or various combinations or components thereof may support a method for performing one or more of the functions described herein.

In some aspects, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a first network node in accordance with examples as disclosed herein. For example, the communications manager 420 may be configured as or otherwise support a means for receiving, from a second network node, a first signal conveying a first phase. The communications manager 420 may be configured as or otherwise support a means for transmitting, to the second network node, a second signal conveying a second phase, where the second phase is based on an authentication parameter common to the first network node and the second network node and the first phase. The communications manager 420 may be configured as or otherwise support a means for receiving, from the second network node, a third signal conveying a third phase, where the third phase is indicative of a signature parameter, and where the third signal is responsive to the second signal. The communications manager 420 may be configured as or otherwise support a means for communicating with the second network node based on the signature parameter.

Additionally, or alternatively, the communications manager 420 may support wireless communications at a first network node in accordance with examples as disclosed herein. For example, the communications manager 420 may be configured as or otherwise support a means for transmitting a first signal conveying a first phase. The communications manager 420 may be configured as or otherwise support a means for receiving, from a second network node, a second signal conveying a second phase. The communications manager 420 may be configured as or otherwise support a means for determining that the second phase is based on the first phase and an authentication parameter common to the first network node and the second network node. The communications manager 420 may be configured as or otherwise support a means for transmitting, based on the determination, a third signal conveying a third phase to the second network node, where the third phase is indicative of a signature parameter. The communications manager 420 may be configured as or otherwise support a means for communicating with the second network node based on the signature parameter.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing and more efficient utilization of communication resources.

Figure 5:
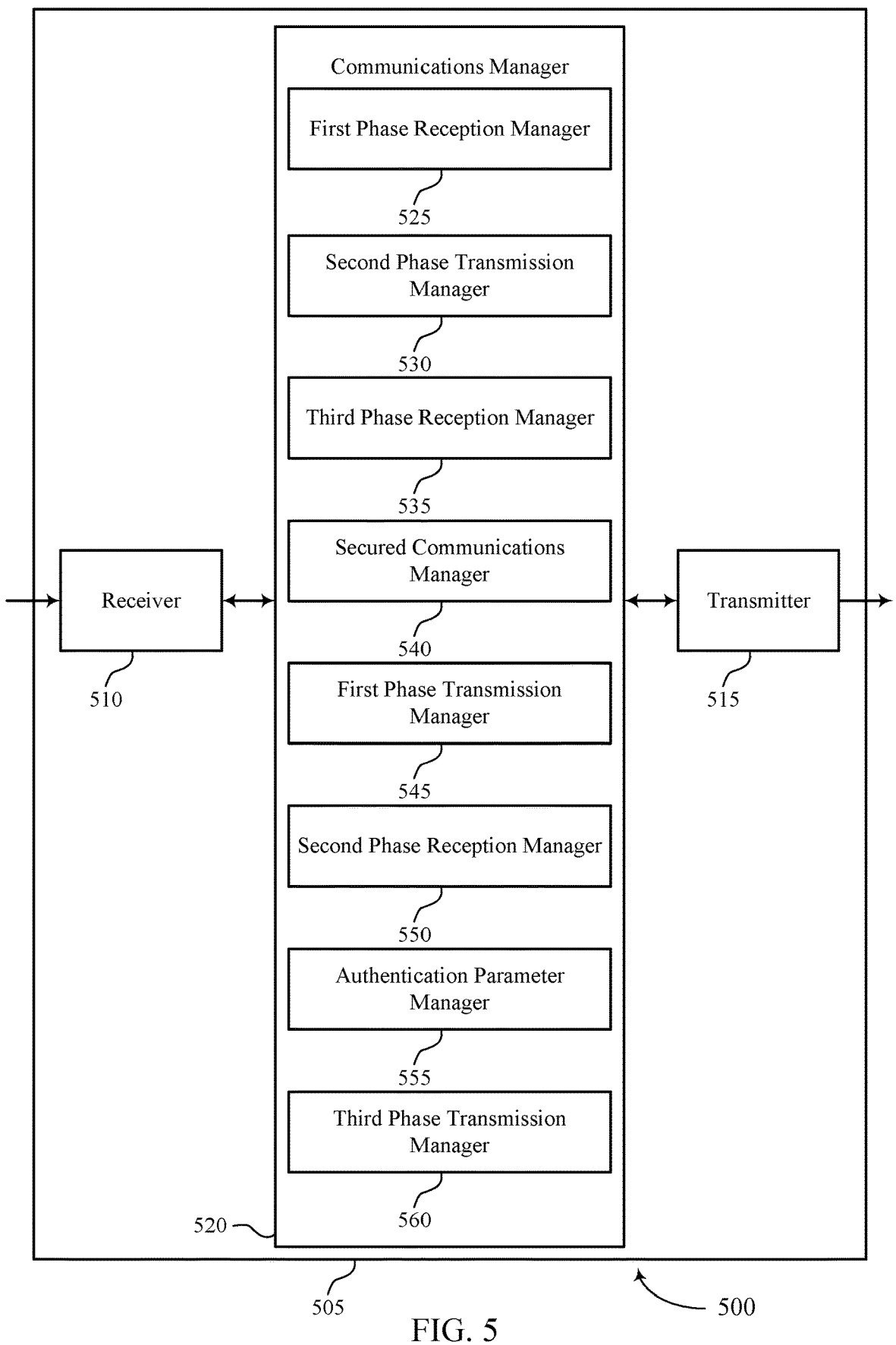

FIG. 5 shows a block diagram 500 of a device 505 that supports secure configuration sharing over reference signals in accordance with one or more aspects of the present disclosure. The device 505 may be an example of aspects of a device 405, a UE 115, or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to secure configuration sharing over reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to secure configuration sharing over reference signals). In some aspects, the transmitter 515 may be co-located with a receiver 510 in a transceiver module. The transmitter 515 may utilize a single antenna or a set of multiple antennas.

The device 505, or various components thereof, may be an example of means for performing various aspects of secure configuration sharing over reference signals as described herein. For example, the communications manager 520 may include a first phase reception manager 525, a second phase transmission manager 530, a third phase reception manager 535, a secured communications manager 540, a first phase transmission manager 545, a second phase reception manager 550, an authentication parameter manager 555, a third phase transmission manager 560, or any combination thereof. The communications manager 520 may be an example of aspects of a communications manager 420 as described herein. In some aspects, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first network node in accordance with examples as disclosed herein. The first phase reception manager 525 may be configured as or otherwise support a means for receiving, from a second network node, a first signal conveying a first phase. The second phase transmission manager 530 may be configured as or otherwise support a means for transmitting, to the second network node, a second signal conveying a second phase, where the second phase is based on an authentication parameter common to the first network node and the second network node and the first phase. The third phase reception manager 535 may be configured as or otherwise support a means for receiving, from the second network node, a third signal conveying a third phase, where the third phase is indicative of a signature parameter, and where the third signal is responsive to the second signal. The secured communications manager 540 may be configured as or otherwise support a means for communicating with the second network node based on the signature parameter.

Additionally, or alternatively, the communications manager 520 may support wireless communications at a first network node in accordance with examples as disclosed herein. The first phase transmission manager 545 may be configured as or otherwise support a means for transmitting a first signal conveying a first phase. The second phase reception manager 550 may be configured as or otherwise support a means for receiving, from a second network node, a second signal conveying a second phase. The authentication parameter manager 555 may be configured as or otherwise support a means for determining that the second phase is based on the first phase and an authentication parameter common to the first network node and the second network node. The third phase transmission manager 560 may be configured as or otherwise support a means for transmitting, based on the determination, a third signal conveying a third phase to the second network node, where the third phase is indicative of a signature parameter. The secured communications manager 540 may be configured as or otherwise support a means for communicating with the second network node based on the signature parameter.

Figure 6:
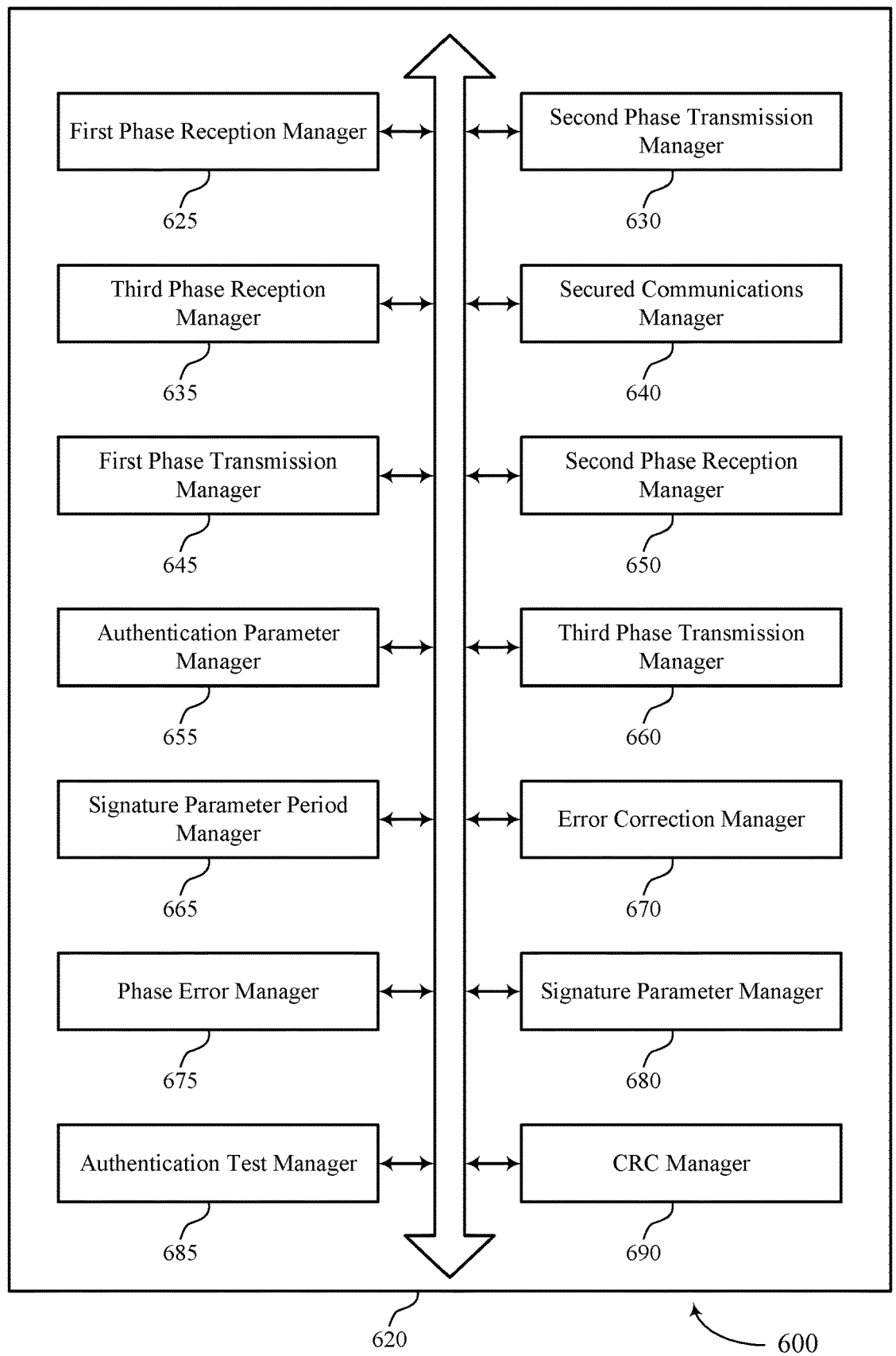
FIG. 6 shows a block diagram of a communications manager that supports secure configuration sharing over reference signals in accordance with one or more aspects of the present disclosure.

FIG. 6 shows a block diagram 600 of a communications manager 620 that supports secure configuration sharing over reference signals in accordance with one or more aspects of the present disclosure. The communications manager 620 may be an example of aspects of a communications manager 420, a communications manager 520, or both, as described herein. The communications manager 620, or various components thereof, may be an example of means for performing various aspects of secure configuration sharing over reference signals as described herein. For example, the communications manager 620 may include a first phase reception manager 625, a second phase transmission manager 630, a third phase reception manager 635, a secured communications manager 640, a first phase transmission manager 645, a second phase reception manager 650, an authentication parameter manager 655, a third phase transmission manager 660, a signature parameter period manager 665, an error correction manager 670, a phase error manager 675, a signature parameter manager 680, an authentication test manager 685, an CRC manager 690, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications at a first network node in accordance with examples as disclosed herein. The first phase reception manager 625 may be configured as or otherwise support a means for receiving, from a second network node, a first signal conveying a first phase. The second phase transmission manager 630 may be configured as or otherwise support a means for transmitting, to the second network node, a second signal conveying a second phase, where the second phase is based on an authentication parameter common to the first network node and the second network node and the first phase. The third phase reception manager 635 may be configured as or otherwise support a means for receiving, from the second network node, a third signal conveying a third phase, where the third phase is indicative of a signature parameter, and where the third signal is responsive to the second signal. The secured communications manager 640 may be configured as or otherwise support a means for communicating with the second network node based on the signature parameter.

In some aspects, to support communicating with the second network node based on the signature parameter, the secured communications manager 640 may be configured as or otherwise support a means for receiving, from the second network node, a data signal. In some aspects, to support communicating with the second network node based on the signature parameter, the secured communications manager 640 may be configured as or otherwise support a means for decoding the data signal based on the signature parameter.

In some aspects, to support communicating with the second network node based on the signature parameter, the signature parameter period manager 665 may be configured as or otherwise support a means for using the signature parameter in communications with the second network node during a period of time.

In some aspects, to support communicating with the second network node based on the signature parameter, the signature parameter period manager 665 may be configured as or otherwise support a means for determining, after the period of time, a second signature parameter for second communications with the second network node during a second period of time.

In some aspects, the signature parameter is based on the third phase and the second phase.

In some aspects, the authentication parameter manager 655 may be configured as or otherwise support a means for receiving, via a layer three signal, the authentication parameter before transmission of the second signal.

In some aspects, to support receiving the authentication parameter via the layer three signal, the authentication parameter manager 655 may be configured as or otherwise support a means for receiving the layer three signal from the second network node.

In some aspects, the error correction manager 670 may be configured as or otherwise support a means for determining, based on error correction information conveyed via the third signal, that the signature parameter is incorrect, where communicating with the second network node based on the signature parameter includes transmitting a NACK to the second network node indicative of that the signature parameter is incorrect.

In some aspects, to support determining, based on the error correction information, that the signature parameter is incorrect, where the error correction information includes first CRC information associated with the signature parameter, the CRC manager 690 may be configured as or otherwise support a means for comparing the first cyclic redundancy check information to expected cyclic redundancy check information.

In some aspects, the error correction manager 670 may be configured as or otherwise support a means for determining, based on error correction information conveyed via the third signal, that the signature parameter is correct, where communicating with the second network node based on the signature parameter includes refraining from transmission of a NACK to the second network node indicative of an incorrect signature parameter.

In some aspects, the phase error manager 675 may be configured as or otherwise support a means for determining a phase error threshold and a phase error level of a channel via which the first signal, the second signal, and the third signal are communicated. In some aspects, the signature parameter manager 680 may be configured as or otherwise support a means for determining the signature parameter based on the phase error level being less than the phase error threshold.

In some aspects, the first signal includes an authentication request, the second signal includes a configuration request and authentication response, and the third signal includes a configuration response.

In some aspects, the first signal conveys a request for a prior signature parameter. In some aspects, the authentication parameter includes the prior signature parameter.

In some aspects, the first signal is received, the second signal is transmitted, and the third signal is received within a time period that is less than a channel coherence time period.

Additionally, or alternatively, the communications manager 620 may support wireless communications at a first network node in accordance with examples as disclosed herein. The first phase transmission manager 645 may be configured as or otherwise support a means for transmitting a first signal conveying a first phase. The second phase reception manager 650 may be configured as or otherwise support a means for receiving, from a second network node, a second signal conveying a second phase. The authentication parameter manager 655 may be configured as or otherwise support a means for determining that the second phase is based on the first phase and an authentication parameter common to the first network node and the second network node. The third phase transmission manager 660 may be configured as or otherwise support a means for transmitting, based on the determination, a third signal conveying a third phase to the second network node, where the third phase is indicative of a signature parameter. In some aspects, the secured communications manager 640 may be configured as or otherwise support a means for communicating with the second network node based on the signature parameter.

In some aspects, to support communicating with the second network node based on the signature parameter, the secured communications manager 640 may be configured as or otherwise support a means for transmitting, to the second network node, a data signal encoded based on the signature parameter.

In some aspects, to support communicating with the second network node based on the signature parameter, the signature parameter period manager 665 may be configured as or otherwise support a means for using the signature parameter in communications with the second network node during a period of time.

In some aspects, to support communicating with the second network node based on the signature parameter, the signature parameter period manager 665 may be configured as or otherwise support a means for determining, after the period of time, a second signature parameter for second communications with the second network node during a second period of time.

In some aspects, to support determining that the second phase is based on the authentication parameter, the authentication parameter manager 655 may be configured as or otherwise support a means for determining that the second phase is within a threshold of an expected second phase.

In some aspects, the third phase is based on the second phase and the signature parameter.

In some aspects, the second phase reception manager 650 may be configured as or otherwise support a means for receiving, from a third network node, a fourth signal conveying a fourth phase. In some aspects, the authentication parameter manager 655 may be configured as or otherwise support a means for determining a second authentication parameter associated with the third network node based on the fourth phase and the first phase. In some aspects, the authentication parameter manager 655 may be configured as or otherwise support a means for determining that the second authentication parameter is not within a threshold of an expected authentication parameter.

In some aspects, the authentication parameter manager 655 may be configured as or otherwise support a means for transmitting, to the second network node, the authentication parameter via a layer three signal before reception of the second signal.

In some aspects, the authentication parameter manager 655 may be configured as or otherwise support a means for receiving the authentication parameter before reception of the second signal and via a layer three signal.

In some aspects, the first phase transmission manager 645 may be configured as or otherwise support a means for randomly determining the first phase.

In some aspects, the error correction manager 670 may be configured as or otherwise support a means for transmitting, with the third signal, error correction information, where, communicating with the second network node based on the signature parameter includes receiving a NACK from the second network node corresponding to the signature parameter.

In some aspects, the phase error manager 675 may be configured as or otherwise support a means for determining a phase error threshold and a phase error level of a channel via which the first signal, the second signal, and the third signal are communicated. In some aspects, the authentication parameter manager 655 may be configured as or otherwise support a means for determining the authentication parameter based on the phase error level being less than the phase error threshold.

In some aspects, the first signal includes an authentication request, the second signal includes a configuration request and authentication response, and the third signal includes a configuration response.

In some aspects, the first signal conveys a request for a prior signature parameter. In some aspects, the authentication parameter includes the prior signature parameter.

In some aspects, the authentication test manager 685 may be configured as or otherwise support a means for applying an authentication test to the authentication parameter, and transmitting the third signal based on the authentication test.

In some aspects, the authentication test includes one of a distribution-based hypothesis test or a hamming-distance-based similarity test.

In some aspects, the authentication parameter manager 655 may be configured as or otherwise support a means for determining that the authentication parameter is authentic, where transmitting the third signal is based on the determination that the authentication parameter is authentic.

In some aspects, reception of the first signal, transmission of the second signal, and reception of the third signal occur within a period of time less than a channel coherence time period.

Figure 7:
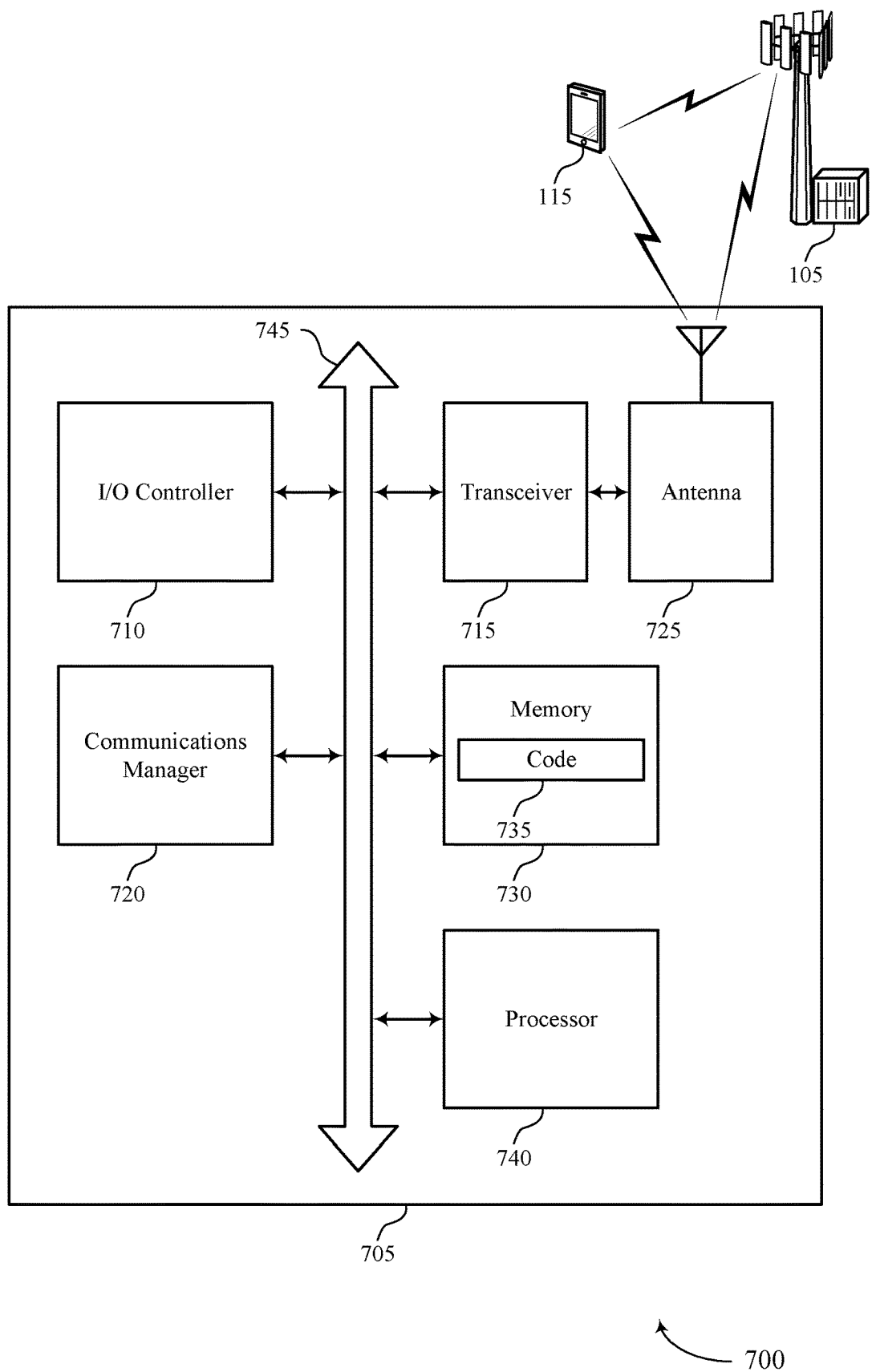
FIG. 7 shows a diagram of a system including a UE that supports secure configuration sharing over reference signals in accordance with one or more aspects of the present disclosure.

FIG. 7 shows a diagram of a system 700 including a device 705 that supports secure configuration sharing over reference signals in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting secure configuration sharing over reference signals). For example, the device 705 or a component of the device 705 may include a processor 740 and memory 730 coupled with or to the processor 740, the processor 740 and memory 730 configured to perform various functions described herein.

The communications manager 720 may support wireless communications at a first network node in accordance with examples as disclosed herein. For example, the communications manager 720 may be configured as or otherwise support a means for receiving, from a second network node, a first signal conveying a first phase. The communications manager 720 may be configured as or otherwise support a means for transmitting, to the second network node, a second signal conveying a second phase, where the second phase is based on an authentication parameter common to the first network node and the second network node and the first phase. The communications manager 720 may be configured as or otherwise support a means for receiving, from the second network node, a third signal conveying a third phase, where the third phase is indicative of a signature parameter, and where the third signal is responsive to the second signal. The communications manager 720 may be configured as or otherwise support a means for communicating with the second network node based on the signature parameter.

Additionally, or alternatively, the communications manager 720 may support wireless communications at a first network node in accordance with examples as disclosed herein. For example, the communications manager 720 may be configured as or otherwise support a means for transmitting a first signal conveying a first phase. The communications manager 720 may be configured as or otherwise support a means for receiving, from a second network node, a second signal conveying a second phase. The communications manager 720 may be configured as or otherwise support a means for determining that the second phase is based on the first phase and an authentication parameter common to the first network node and the second network node. The communications manager 720 may be configured as or otherwise support a means for transmitting, based on the determination, a third signal conveying a third phase to the second network node, where the third phase is indicative of a signature parameter. The communications manager 720 may be configured as or otherwise support a means for communicating with the second network node based on the signature parameter.

By including or configuring the communications manager 720 in accordance with examples as described herein, the device 705 may support techniques for improved communication reliability, reduced latency, more efficient utilization of communication resources, improved coordination between devices, and improved utilization of processing capability.

In some aspects, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some aspects, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of secure configuration sharing over reference signals as described herein, or the processor 740 and the memory 730 may be otherwise configured to perform or support such operations.

Figure 8:
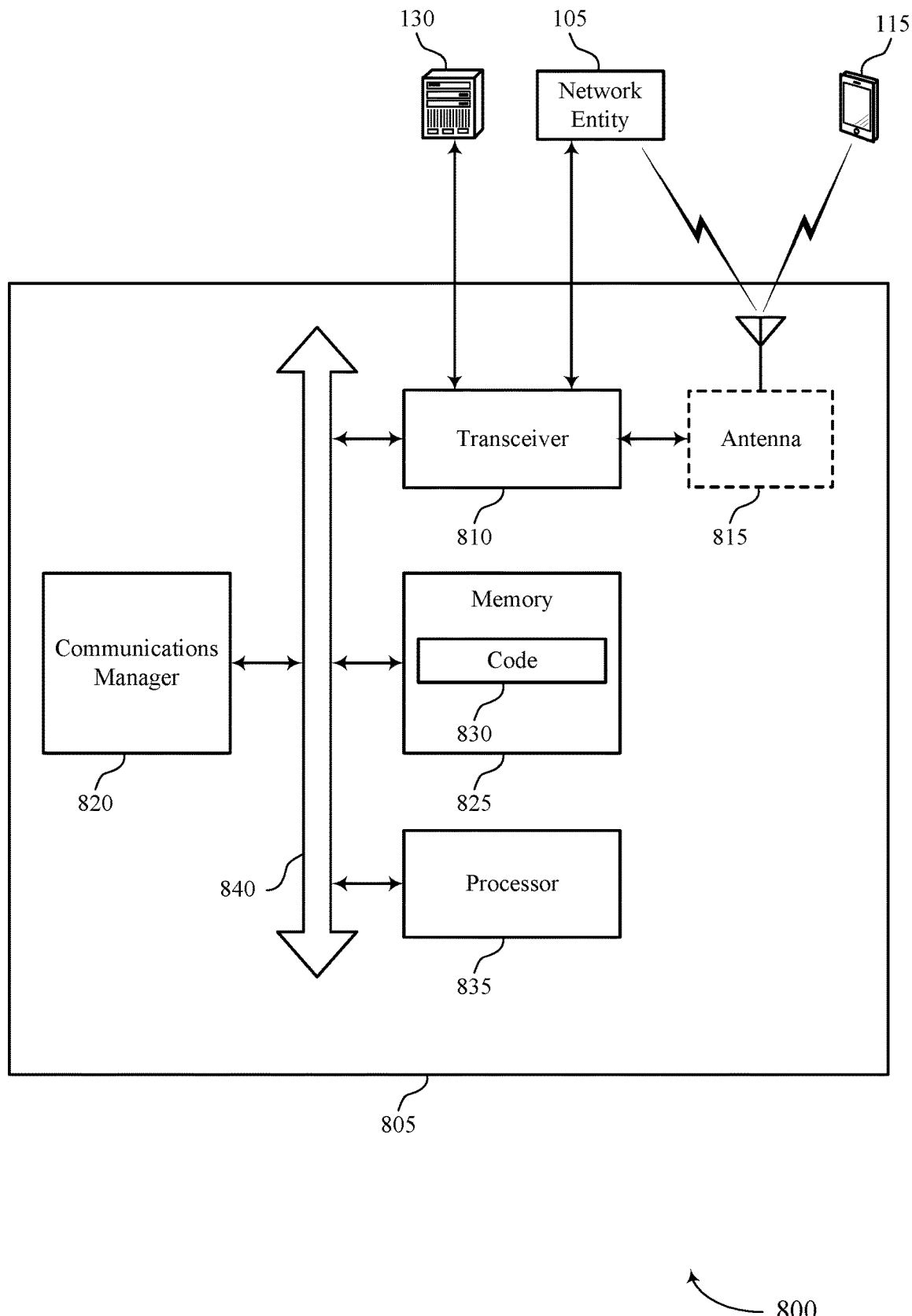
FIG. 8 shows a diagram of a system including a network entity that supports secure configuration sharing over reference signals in accordance with one or more aspects of the present disclosure.

FIG. 8 shows a diagram of a system 800 including a device 805 that supports secure configuration sharing over reference signals in accordance with one or more aspects of the present disclosure. The device 805 may be an example of or include the components of a device 405, a device 505, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some aspects, the transceiver 810 may include a wired transceiver and may communicate bi-directionally with another wired transceiver. Additionally, or alternatively, in some aspects, the transceiver 810 may include a wireless transceiver and may communicate bi-directionally with another wireless transceiver. In some aspects, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 415, a transmitter 515, a receiver 410, a receiver 510, or any combination thereof or component thereof, as described herein. In some aspects, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting secure configuration sharing over reference signals). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some aspects, a bus 840 may support communications of (e.g., within) a protocol layer of a protocol stack. In some aspects, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some aspects, the communications manager 820 may manage aspects of communications with a core network 130 (e.g., via one or more wired or wireless backhaul links). For example, the communications manager 820 may manage the transfer of data communications for client devices, such as one or more UEs 115. In some aspects, the communications manager 820 may manage communications with other network entities 105, and may include a controller or scheduler for controlling communications with UEs 115 in cooperation with other network entities 105. In some aspects, the communications manager 820 may support an X2 interface within an LTE/LTE-A wireless communications network technology to provide communication between network entities 105.

The communications manager 820 may support wireless communications at a first network node in accordance with examples as disclosed herein. For example, the communications manager 820 may be configured as or otherwise support a means for receiving, from a second network node, a first signal conveying a first phase. The communications manager 820 may be configured as or otherwise support a means for transmitting, to the second network node, a second signal conveying a second phase, where the second phase is based on an authentication parameter common to the first network node and the second network node and the first phase. The communications manager 820 may be configured as or otherwise support a means for receiving, from the second network node, a third signal conveying a third phase, where the third phase is indicative of a signature parameter, and where the third signal is responsive to the second signal. The communications manager 820 may be configured as or otherwise support a means for communicating with the second network node based on the signature parameter.

Additionally, or alternatively, the communications manager 820 may support wireless communications at a first network node in accordance with examples as disclosed herein. For example, the communications manager 820 may be configured as or otherwise support a means for transmitting a first signal conveying a first phase. The communications manager 820 may be configured as or otherwise support a means for receiving, from a second network node, a second signal conveying a second phase. The communications manager 820 may be configured as or otherwise support a means for determining that the second phase is based on the first phase and an authentication parameter common to the first network node and the second network node. The communications manager 820 may be configured as or otherwise support a means for transmitting, based on the determination, a third signal conveying a third phase to the second network node, where the third phase is indicative of a signature parameter. The communications manager 820 may be configured as or otherwise support a means for communicating with the second network node based on the signature parameter.

By including or configuring the communications manager 820 in accordance with examples as described herein, the device 805 may support techniques for improved communication reliability, reduced latency, more efficient utilization of communication resources, improved coordination between devices, and improved utilization of processing capability.

In some aspects, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some aspects, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of secure configuration sharing over reference signals as described herein, or the processor 835 and the memory 825 may be otherwise configured to perform or support such operations.

Figure 9:
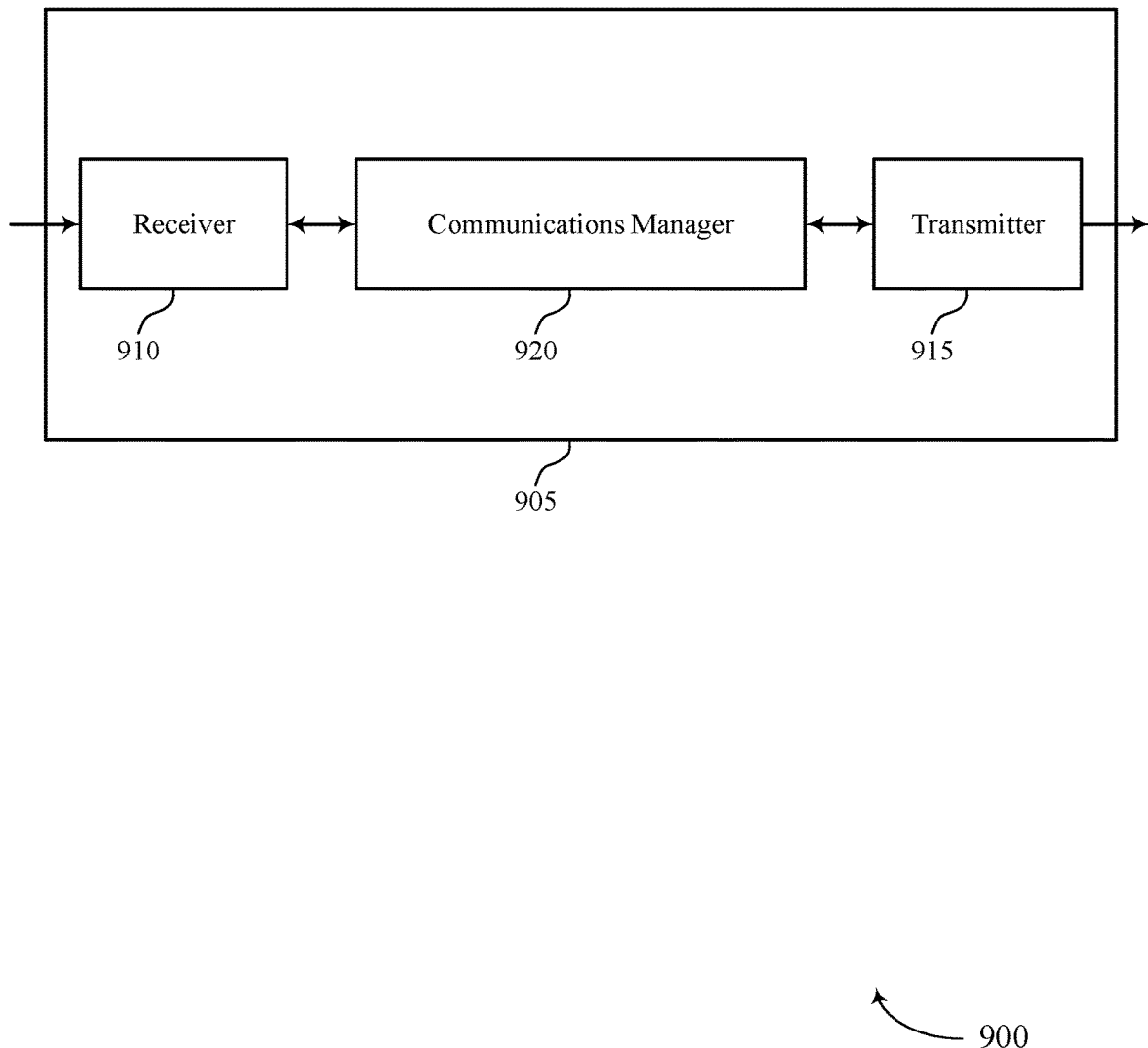
FIGS. 9 and 10 show block diagrams of devices that support secure configuration sharing over reference signals in accordance with one or more aspects of the present disclosure.

FIG. 9 shows a block diagram 900 of a device 905 that supports secure configuration sharing over reference signals in accordance with one or more aspects of the present disclosure. The device 905 may be an example of aspects of a UE 115 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to secure configuration sharing over reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to secure configuration sharing over reference signals). In some aspects, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of secure configuration sharing over reference signals as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first network node in accordance with examples as disclosed herein. For example, the communications manager 920 may be configured as or otherwise support a means for receiving, from a second network node, a first signal conveying a first phase. The communications manager 920 may be configured as or otherwise support a means for transmitting, to the second network node, a second signal conveying a second phase, where the second phase is based on an authentication parameter common to the first network node and the second network node and the first phase. The communications manager 920 may be configured as or otherwise support a means for receiving, from the second network node, a third signal conveying a third phase, where the third phase is indicative of a signature parameter, and where the third signal is responsive to the second signal. The communications manager 920 may be configured as or otherwise support a means for communicating with the second network node based on the signature parameter.

Additionally, or alternatively, the communications manager 920 may support wireless communications at a first network node in accordance with examples as disclosed herein. For example, the communications manager 920 may be configured as or otherwise support a means for transmitting a first signal conveying a first phase. The communications manager 920 may be configured as or otherwise support a means for receiving, from a second network node, a second signal conveying a second phase. The communications manager 920 may be configured as or otherwise support a means for determining that the second phase is based on the first phase and an authentication parameter common to the first network node and the second network node. The communications manager 920 may be configured as or otherwise support a means for transmitting, based on the determination, a third signal conveying a third phase to the second network node, where the third phase is indicative of a signature parameter. The communications manager 920 may be configured as or otherwise support a means for communicating with the second network node based on the signature parameter.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and more efficient utilization of communication resources.

Figure 10:
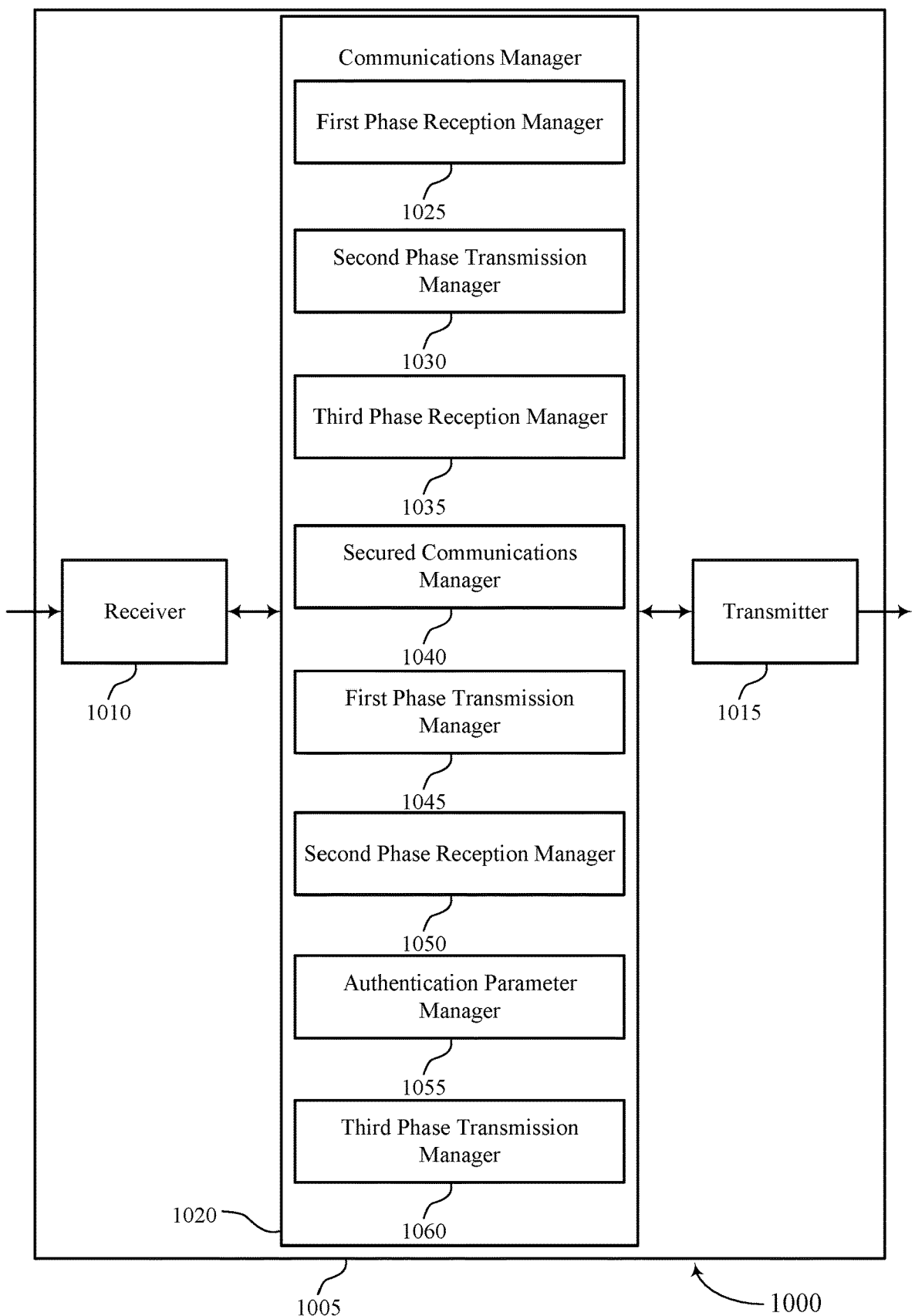

FIG. 10 shows a block diagram 1000 of a device 1005 that supports secure configuration sharing over reference signals in accordance with one or more aspects of the present disclosure. The device 1005 may be an example of aspects of a device 905, a UE 115, or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to secure configuration sharing over reference signals). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to secure configuration sharing over reference signals). In some aspects, the transmitter 1015 may be co-located with a receiver 1010 in a transceiver module. The transmitter 1015 may utilize a single antenna or a set of multiple antennas.

The device 1005, or various components thereof, may be an example of means for performing various aspects of secure configuration sharing over reference signals as described herein. For example, the communications manager 1020 may include a first phase reception manager 1025, a second phase transmission manager 1030, a third phase reception manager 1035, a secured communications manager 1040, a first phase transmission manager 1045, a second phase reception manager 1050, an authentication parameter manager 1055, a third phase transmission manager 1060, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first network node in accordance with examples as disclosed herein. The first phase reception manager 1025 may be configured as or otherwise support a means for receiving, from a second network node, a first signal conveying a first phase. The second phase transmission manager 1030 may be configured as or otherwise support a means for transmitting, to the second network node, a second signal conveying a second phase, where the second phase is based on an authentication parameter common to the first network node and the second network node and the first phase. The third phase reception manager 1035 may be configured as or otherwise support a means for receiving, from the second network node, a third signal conveying a third phase, where the third phase is indicative of a signature parameter, and where the third signal is responsive to the second signal. The secured communications manager 1040 may be configured as or otherwise support a means for communicating with the second network node based on the signature parameter.

Additionally, or alternatively, the communications manager 1020 may support wireless communications at a first network node in accordance with examples as disclosed herein. The first phase transmission manager 1045 may be configured as or otherwise support a means for transmitting a first signal conveying a first phase. The second phase reception manager 1050 may be configured as or otherwise support a means for receiving, from a second network node, a second signal conveying a second phase. The authentication parameter manager 1055 may be configured as or otherwise support a means for determining that the second phase is based on the first phase and an authentication parameter common to the first network node and the second network node. The third phase transmission manager 1060 may be configured as or otherwise support a means for transmitting, based on the determination, a third signal conveying a third phase to the second network node, where the third phase is indicative of a signature parameter. The secured communications manager 1040 may be configured as or otherwise support a means for communicating with the second network node based on the signature parameter.

Figure 11:
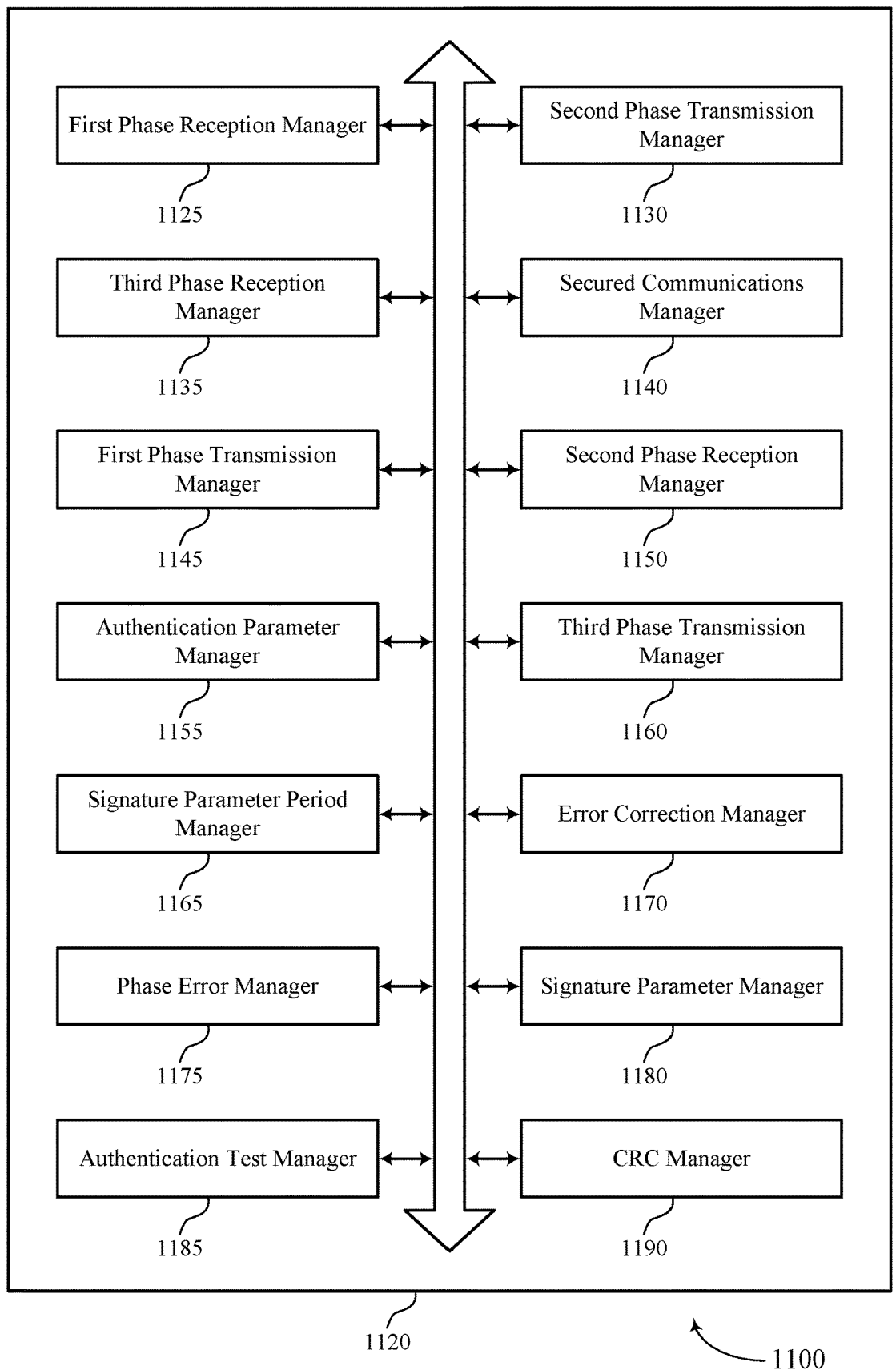
FIG. 11 shows a block diagram of a communications manager that supports secure configuration sharing over reference signals in accordance with one or more aspects of the present disclosure.

FIG. 11 shows a block diagram 1100 of a communications manager 1120 that supports secure configuration sharing over reference signals in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of secure configuration sharing over reference signals as described herein. For example, the communications manager 1120 may include a first phase reception manager 1125, a second phase transmission manager 1130, a third phase reception manager 1135, a secured communications manager 1140, a first phase transmission manager 1145, a second phase reception manager 1150, an authentication parameter manager 1155, a third phase transmission manager 1160, a signature parameter period manager 1165, an error correction manager 1170, a phase error manager 1175, a signature parameter manager 1180, an authentication test manager 1185, an CRC manager 1190, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a first network node in accordance with examples as disclosed herein. The first phase reception manager 1125 may be configured as or otherwise support a means for receiving, from a second network node, a first signal conveying a first phase. The second phase transmission manager 1130 may be configured as or otherwise support a means for transmitting, to the second network node, a second signal conveying a second phase, where the second phase is based on an authentication parameter common to the first network node and the second network node and the first phase. The third phase reception manager 1135 may be configured as or otherwise support a means for receiving, from the second network node, a third signal conveying a third phase, where the third phase is indicative of a signature parameter, and where the third signal is responsive to the second signal. The secured communications manager 1140 may be configured as or otherwise support a means for communicating with the second network node based on the signature parameter.

In some aspects, to support communicating with the second network node based on the signature parameter, the secured communications manager 1140 may be configured as or otherwise support a means for receiving, from the second network node, a data signal. In some aspects, to support communicating with the second network node based on the signature parameter, the secured communications manager 1140 may be configured as or otherwise support a means for decoding the data signal based on the signature parameter.

In some aspects, to support communicating with the second network node based on the signature parameter, the signature parameter period manager 1165 may be configured as or otherwise support a means for using the signature parameter in communications with the second network node during a period of time.

In some aspects, to support communicating with the second network node based on the signature parameter, the signature parameter period manager 1165 may be configured as or otherwise support a means for determining, after the period of time, a second signature parameter for second communications with the second network node during a second period of time.

In some aspects, the signature parameter is based on the third phase and the second phase.

In some aspects, the authentication parameter manager 1155 may be configured as or otherwise support a means for receiving, via a layer three signal, the authentication parameter before transmission of the second signal.

In some aspects, to support receiving the authentication parameter via the layer three signal, the authentication parameter manager 1155 may be configured as or otherwise support a means for receiving the layer three signal from the second network node.

In some aspects, the error correction manager 1170 may be configured as or otherwise support a means for determining, based on error correction information conveyed via the third signal, that the signature parameter is incorrect, where communicating with the second network node based on the signature parameter includes transmitting a NACK to the second network node indicative of that the signature parameter is incorrect.

In some aspects, to support determining, based on the error correction information, that the signature parameter is incorrect, the CRC manager 1190 may be configured as or otherwise support a means for comparing the first cyclic redundancy check information to expected cyclic redundancy check information.

In some aspects, the error correction manager 1170 may be configured as or otherwise support a means for determining, based on error correction information conveyed via the third signal, that the signature parameter is correct, where communicating with the second network node based on the signature parameter includes refraining from transmission of a NACK to the second network node indicative of an incorrect signature parameter.

In some aspects, the phase error manager 1175 may be configured as or otherwise support a means for determining a phase error threshold and a phase error level of a channel via which the first signal, the second signal, and the third signal are communicated. In some aspects, the signature parameter manager 1180 may be configured as or otherwise support a means for determining the signature parameter based on the phase error level being less than the phase error threshold.

In some aspects, the first signal includes an authentication request, the second signal includes a configuration request and authentication response, and the third signal includes a configuration response.

In some aspects, the first signal conveys a request for a prior signature parameter. In some aspects, the authentication parameter includes the prior signature parameter.

In some aspects, the first signal is received, the second signal is transmitted, and the third signal is received within a time period that is less than a channel coherence time period.

Additionally, or alternatively, the communications manager 1120 may support wireless communications at a first network node in accordance with examples as disclosed herein. The first phase transmission manager 1145 may be configured as or otherwise support a means for transmitting a first signal conveying a first phase. The second phase reception manager 1150 may be configured as or otherwise support a means for receiving, from a second network node, a second signal conveying a second phase. The authentication parameter manager 1155 may be configured as or otherwise support a means for determining that the second phase is based on the first phase and an authentication parameter common to the first network node and the second network node. The third phase transmission manager 1160 may be configured as or otherwise support a means for transmitting, based on the determination, a third signal conveying a third phase to the second network node, where the third phase is indicative of a signature parameter. In some aspects, the secured communications manager 1140 may be configured as or otherwise support a means for communicating with the second network node based on the signature parameter.

In some aspects, to support communicating with the second network node based on the signature parameter, the secured communications manager 1140 may be configured as or otherwise support a means for transmitting, to the second network node, a data signal encoded based on the signature parameter.

In some aspects, to support communicating with the second network node based on the signature parameter, the signature parameter period manager 1165 may be configured as or otherwise support a means for using the signature parameter in communications with the second network node during a period of time.

In some aspects, to support communicating with the second network node based on the signature parameter, the signature parameter period manager 1165 may be configured as or otherwise support a means for determining, after the period of time, a second signature parameter for second communications with the second network node during a second period of time.

In some aspects, to support determining that the second phase is based on the authentication parameter, the authentication parameter manager 1155 may be configured as or otherwise support a means for determining that the second phase is within a threshold of an expected second phase.

In some aspects, the third phase is based on the second phase and the signature parameter.

In some aspects, the second phase reception manager 1150 may be configured as or otherwise support a means for receiving, from a third network node, a fourth signal conveying a fourth phase. In some aspects, the authentication parameter manager 1155 may be configured as or otherwise support a means for determining a second authentication parameter associated with the third network node based on the fourth phase and the first phase. In some aspects, the authentication parameter manager 1155 may be configured as or otherwise support a means for determining that the second authentication parameter is not within a threshold of an expected authentication parameter.

In some aspects, the authentication parameter manager 1155 may be configured as or otherwise support a means for transmitting, to the second network node, the authentication parameter via a layer three signal before reception of the second signal.

In some aspects, the authentication parameter manager 1155 may be configured as or otherwise support a means for receiving the authentication parameter before reception of the second signal and via a layer three signal.

In some aspects, the first phase transmission manager 1145 may be configured as or otherwise support a means for randomly determining the first phase.

In some aspects, the error correction manager 1170 may be configured as or otherwise support a means for transmitting, with the third signal, error correction information, where communicating with the second network node based on the signature parameter includes receiving a NACK from the second network node corresponding to the signature parameter.

In some aspects, the phase error manager 1175 may be configured as or otherwise support a means for determining a phase error threshold and a phase error level of a channel via which the first signal, the second signal, and the third signal are communicated. In some aspects, the authentication parameter manager 1155 may be configured as or otherwise support a means for determining the authentication parameter based on the phase error level being less than the phase error threshold.

In some aspects, the first signal includes an authentication request, the second signal includes a configuration request and authentication response, and the third signal includes a configuration response.

In some aspects, the first signal conveys a request for a prior signature parameter. In some aspects, the authentication parameter includes the prior signature parameter.

In some aspects, the authentication test manager 1185 may be configured as or otherwise support a means for applying an authentication test to the authentication parameter, and where transmitting the third signal is based on the authentication test.

In some aspects, the authentication test includes one of a distribution-based hypothesis test or a hamming-distance-based similarity test.

In some aspects, the authentication parameter manager 1155 may be configured as or otherwise support a means for determining that the authentication parameter is authentic, where transmitting the third signal is based on the determination that the authentication parameter is authentic.

In some aspects, reception of the first signal, transmission of the second signal, and reception of the third signal occur within a period of time less than a channel coherence time period.

Figure 12:
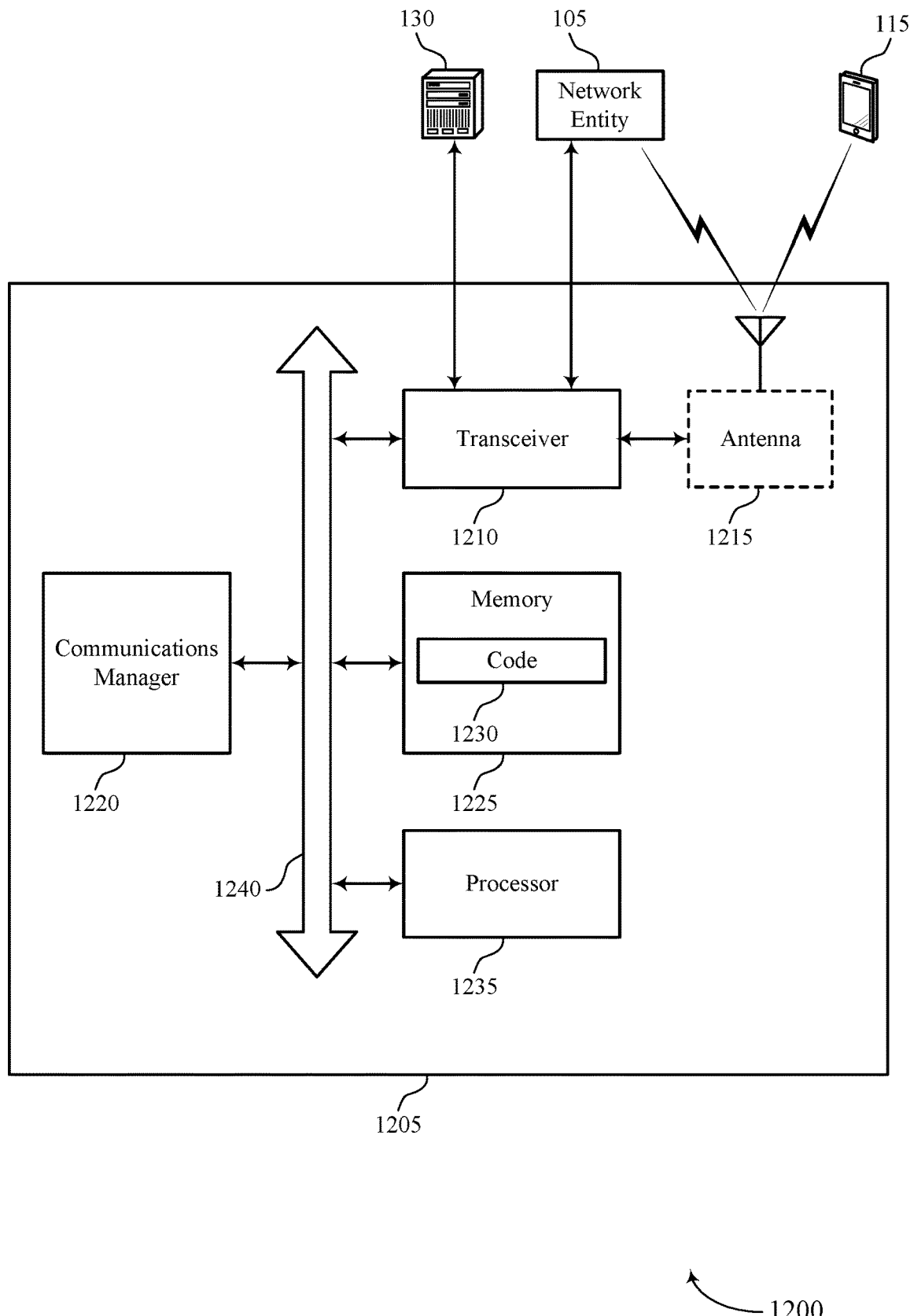
FIG. 12 shows a diagram of a system including a UE that supports secure configuration sharing over reference signals in accordance with one or more aspects of the present disclosure.

FIG. 12 shows a diagram of a system 1200 including a device 1205 that supports secure configuration sharing over reference signals in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some aspects, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting secure configuration sharing over reference signals). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with UEs 115 in cooperation with other network entities 105. In some aspects, the communications manager 1220 may support an X2 interface within an LTE/LTE-A wireless communications network technology to provide communication between network entities 105.

The communications manager 1220 may support wireless communications at a first network node in accordance with examples as disclosed herein. For example, the communications manager 1220 may be configured as or otherwise support a means for receiving, from a second network node, a first signal conveying a first phase. The communications manager 1220 may be configured as or otherwise support a means for transmitting, to the second network node, a second signal conveying a second phase, where the second phase is based on an authentication parameter common to the first network node and the second network node and the first phase. The communications manager 1220 may be configured as or otherwise support a means for receiving, from the second network node, a third signal conveying a third phase, where the third phase is indicative of a signature parameter, and where the third signal is responsive to the second signal. The communications manager 1220 may be configured as or otherwise support a means for communicating with the second network node based on the signature parameter.

Additionally, or alternatively, the communications manager 1220 may support wireless communications at a first network node in accordance with examples as disclosed herein. For example, the communications manager 1220 may be configured as or otherwise support a means for transmitting a first signal conveying a first phase. The communications manager 1220 may be configured as or otherwise support a means for receiving, from a second network node, a second signal conveying a second phase. The communications manager 1220 may be configured as or otherwise support a means for determining that the second phase is based on the first phase and an authentication parameter common to the first network node and the second network node. The communications manager 1220 may be configured as or otherwise support a means for transmitting, based on the determination, a third signal conveying a third phase to the second network node, where the third phase is indicative of a signature parameter. The communications manager 1220 may be configured as or otherwise support a means for communicating with the second network node based on the signature parameter.

By including or configuring the communications manager 1220 in accordance with examples as described herein, the device 1205 may support techniques for improved communication reliability, reduced latency, more efficient utilization of communication resources, improved coordination between devices, and improved utilization of processing capability.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of secure configuration sharing over reference signals as described herein, or the processor 1235 and the memory 1225 may be otherwise configured to perform or support such operations.

Figure 13:
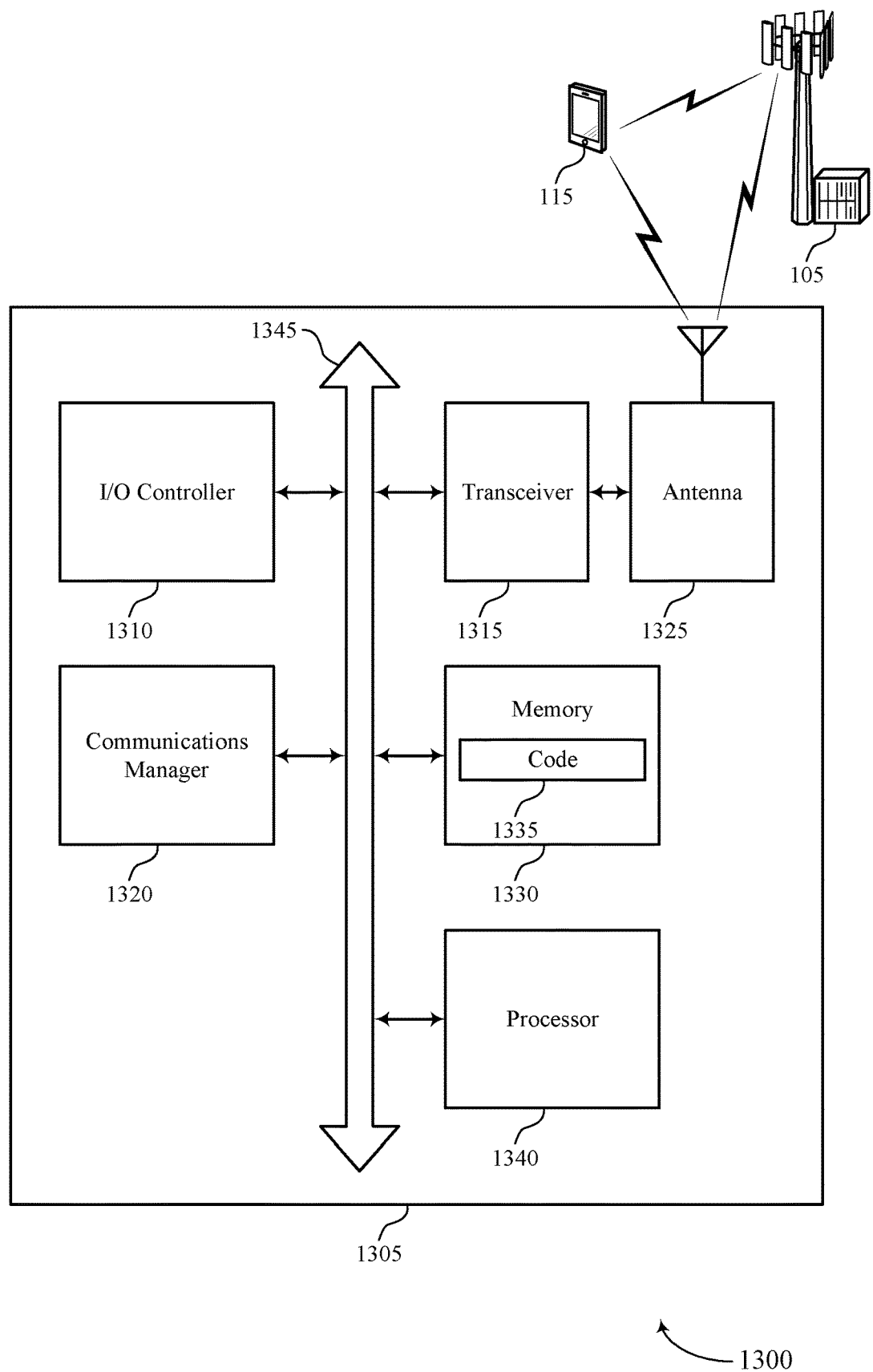
FIG. 13 shows a diagram of a system including a network entity that supports secure configuration sharing over reference signals in accordance with one or more aspects of the present disclosure.

FIG. 13 shows a diagram of a system 1300 including a device 1305 that supports secure configuration sharing over reference signals in accordance with one or more aspects of the present disclosure. The device 1305 may be an example of or include the components of a device 905, a device 1005, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an I/O controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 915, a transmitter 1015, a receiver 910, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting secure configuration sharing over reference signals). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a first network node in accordance with examples as disclosed herein. For example, the communications manager 1320 may be configured as or otherwise support a means for receiving, from a second network node, a first signal conveying a first phase. The communications manager 1320 may be configured as or otherwise support a means for transmitting, to the second network node, a second signal conveying a second phase, where the second phase is based on an authentication parameter common to the first network node and the second network node and the first phase. The communications manager 1320 may be configured as or otherwise support a means for receiving, from the second network node, a third signal conveying a third phase, where the third phase is indicative of a signature parameter, and where the third signal is responsive to the second signal. The communications manager 1320 may be configured as or otherwise support a means for communicating with the second network node based on the signature parameter.

Additionally, or alternatively, the communications manager 1320 may support wireless communications at a first network node in accordance with examples as disclosed herein. For example, the communications manager 1320 may be configured as or otherwise support a means for transmitting a first signal conveying a first phase. The communications manager 1320 may be configured as or otherwise support a means for receiving, from a second network node, a second signal conveying a second phase. The communications manager 1320 may be configured as or otherwise support a means for determining that the second phase is based on the first phase and an authentication parameter common to the first network node and the second network node. The communications manager 1320 may be configured as or otherwise support a means for transmitting, based on the determination, a third signal conveying a third phase to the second network node, where the third phase is indicative of a signature parameter. The communications manager 1320 may be configured as or otherwise support a means for communicating with the second network node based on the signature parameter.

By including or configuring the communications manager 1320 in accordance with examples as described herein, the device 1305 may support techniques for improved communication reliability, reduced latency, more efficient utilization of communication resources, improved coordination between devices, and improved utilization of processing capability.

In some aspects, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some aspects, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of secure configuration sharing over reference signals as described herein, or the processor 1340 and the memory 1330 may be otherwise configured to perform or support such operations.

Figure 14:
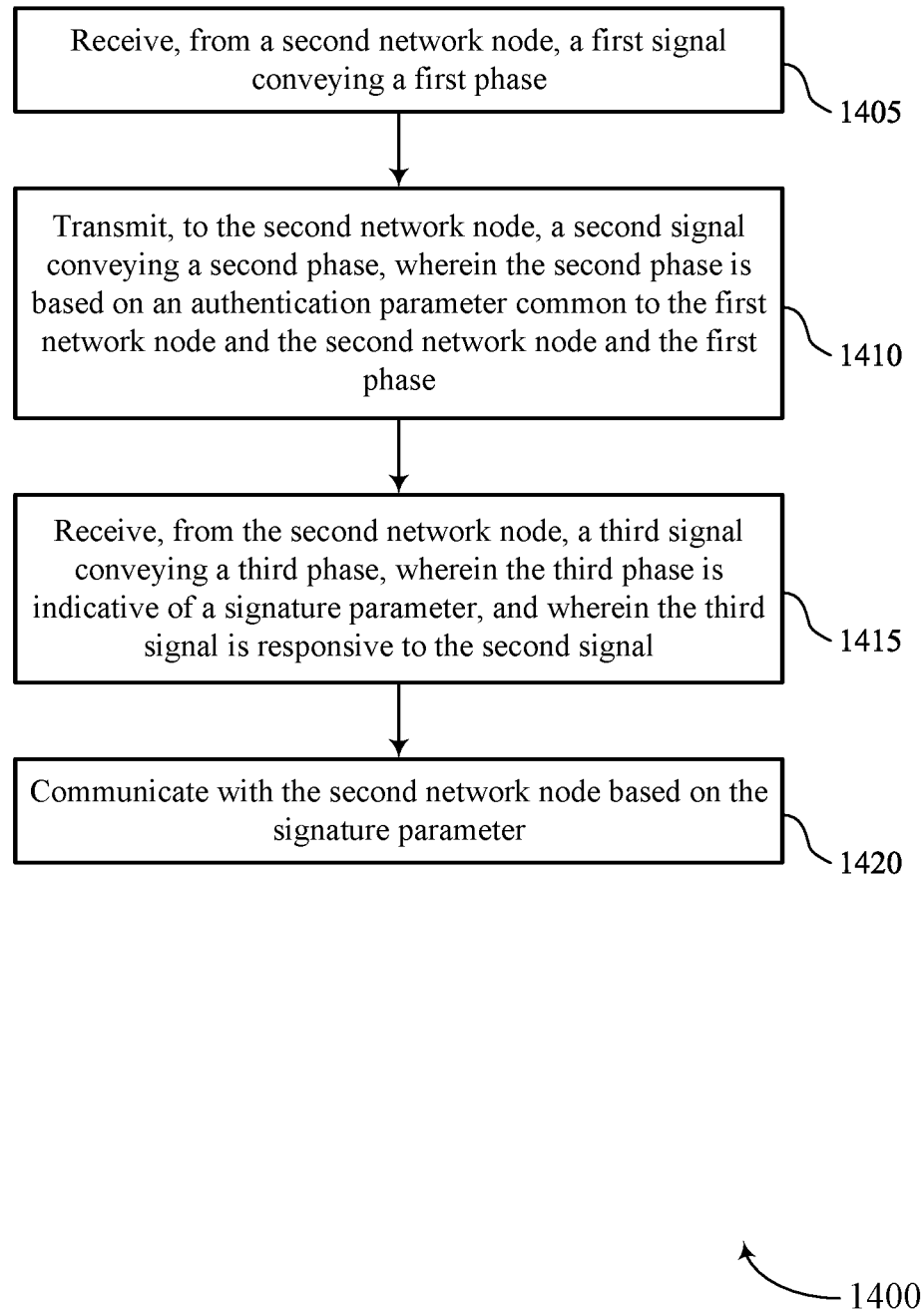
FIGS. 14 through 17 show flowcharts illustrating methods that support secure configuration sharing over reference signals in accordance with one or more aspects of the present disclosure.

FIG. 14 shows a flowchart illustrating a method 1400 that supports secure configuration sharing over reference signals in accordance with one or more aspects of the present disclosure. The operations of the method 1400 may be implemented by a UE or a network entity or its components as described herein. For example, the operations of the method 1400 may be performed by a UE 115 or a network entity as described with reference to FIG. 1 through 8. In some aspects, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include receiving, from a second network node, a first signal conveying a first phase. The operations of 1405 may be performed in accordance with examples as disclosed herein. In some aspects, aspects of the operations of 1405 may be performed by a first phase reception manager 625 as described with reference to FIG. 6.

At 1410, the method may include transmitting, to the second network node, a second signal conveying a second phase, where the second phase is based on an authentication parameter common to the first network node and the second network node and the first phase. The operations of 1410 may be performed in accordance with examples as disclosed herein. In some aspects, aspects of the operations of 1410 may be performed by a second phase transmission manager 630 as described with reference to FIG. 6.

At 1415, the method may include receiving, from the second network node, a third signal conveying a third phase, where the third phase is indicative of a signature parameter, and where the third signal is responsive to the second signal. The operations of 1415 may be performed in accordance with examples as disclosed herein. In some aspects, aspects of the operations of 1415 may be performed by a third phase reception manager 635 as described with reference to FIG. 6.

At 1420, the method may include communicating with the second network node based on the signature parameter. The operations of 1420 may be performed in accordance with examples as disclosed herein. In some aspects, aspects of the operations of 1420 may be performed by a secured communications manager 640 as described with reference to FIG. 6.

Figure 15:
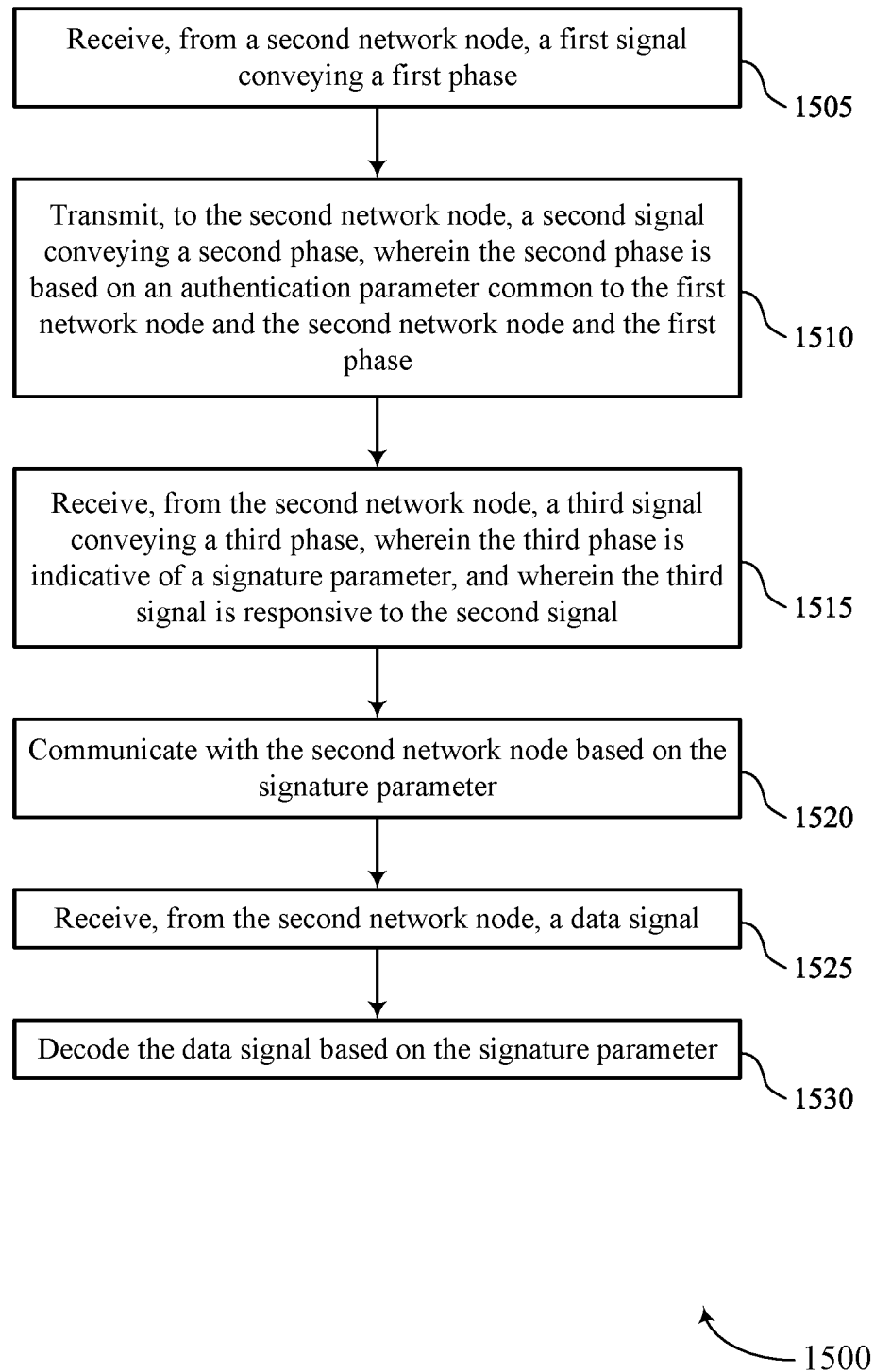

FIG. 15 shows a flowchart illustrating a method 1500 that supports secure configuration sharing over reference signals in accordance with one or more aspects of the present disclosure. The operations of the method 1500 may be implemented by a UE or a network entity or its components as described herein. For example, the operations of the method 1500 may be performed by a UE 115 or a network entity as described with reference to FIG. 1 through 8. In some aspects, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include receiving, from a second network node, a first signal conveying a first phase. The operations of 1505 may be performed in accordance with examples as disclosed herein. In some aspects, aspects of the operations of 1505 may be performed by a first phase reception manager 625 as described with reference to FIG. 6.

At 1510, the method may include transmitting, to the second network node, a second signal conveying a second phase, where the second phase is based on an authentication parameter common to the first network node and the second network node and the first phase. The operations of 1510 may be performed in accordance with examples as disclosed herein. In some aspects, aspects of the operations of 1510 may be performed by a second phase transmission manager 630 as described with reference to FIG. 6.

At 1515, the method may include receiving, from the second network node, a third signal conveying a third phase, where the third phase is indicative of a signature parameter, and where the third signal is responsive to the second signal. The operations of 1515 may be performed in accordance with examples as disclosed herein. In some aspects, aspects of the operations of 1515 may be performed by a third phase reception manager 635 as described with reference to FIG. 6.

At 1520, the method may include communicating with the second network node based on the signature parameter. The operations of 1520 may be performed in accordance with examples as disclosed herein. In some aspects, aspects of the operations of 1520 may be performed by a secured communications manager 640 as described with reference to FIG. 6.

At 1525, the method may include receiving, from the second network node, a data signal. The operations of 1525 may be performed in accordance with examples as disclosed herein. In some aspects, aspects of the operations of 1525 may be performed by a secured communications manager 640 as described with reference to FIG. 6.

At 1530, the method may include decoding the data signal based on the signature parameter. The operations of 1530 may be performed in accordance with examples as disclosed herein. In some aspects, aspects of the operations of 1530 may be performed by a secured communications manager 640 as described with reference to FIG. 6.

Figure 16:
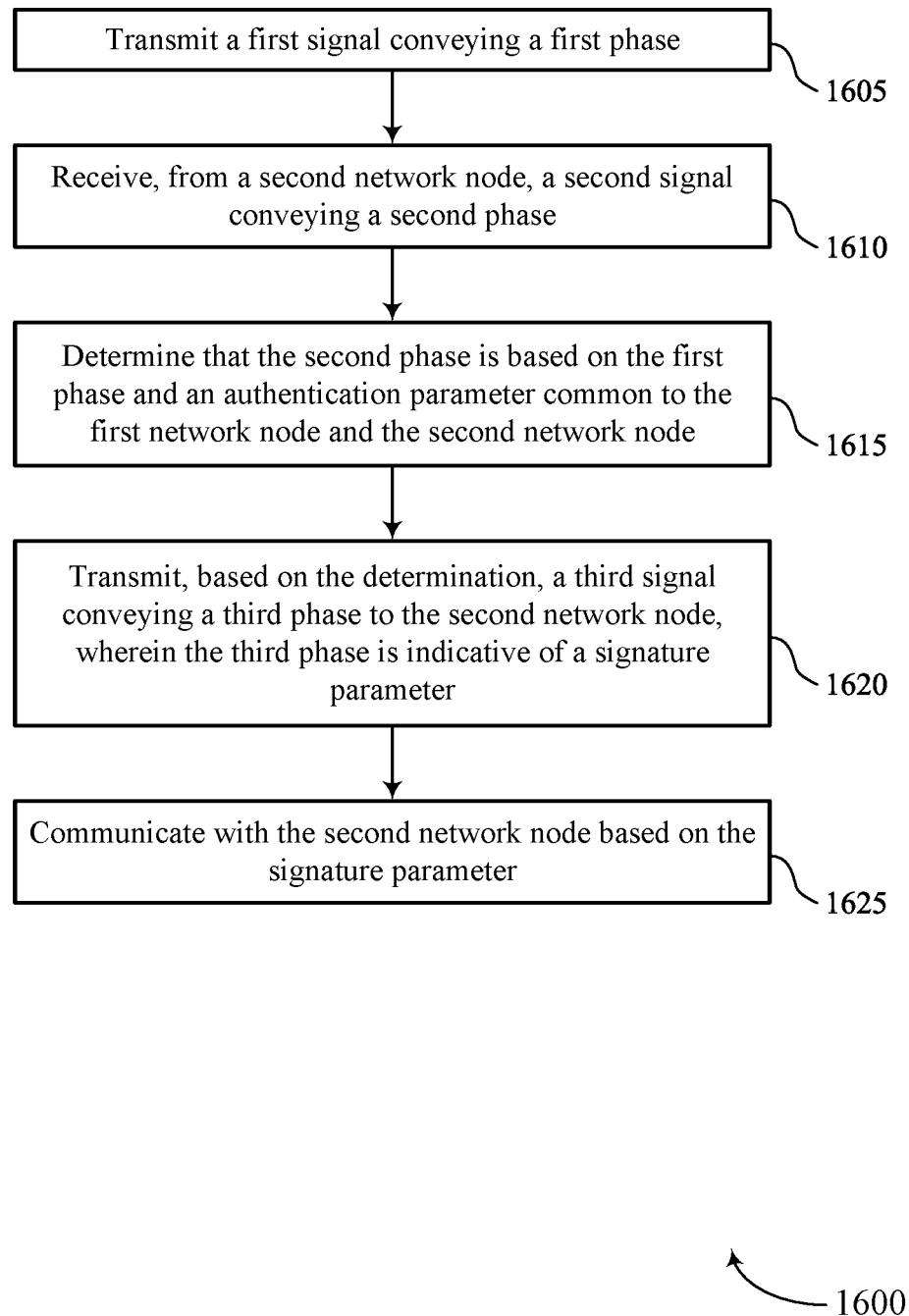

FIG. 16 shows a flowchart illustrating a method 1600 that supports secure configuration sharing over reference signals in accordance with one or more aspects of the present disclosure. The operations of the method 1600 may be implemented by a network entity or a UE or its components as described herein. For example, the operations of the method 1600 may be performed by a network entity or a UE 115 as described with reference to FIGS. 1 through 3 and 9 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1605, the method may include transmitting a first signal conveying a first phase. The operations of 1605 may be performed in accordance with examples as disclosed herein. In some aspects, aspects of the operations of 1605 may be performed by a first phase transmission manager 1145 as described with reference to FIG. 11.

At 1610, the method may include receiving, from a second network node, a second signal conveying a second phase. The operations of 1610 may be performed in accordance with examples as disclosed herein. In some aspects, aspects of the operations of 1610 may be performed by a second phase reception manager 1150 as described with reference to FIG. 11.

At 1615, the method may include determining that the second phase is based on the first phase and an authentication parameter common to the first network node and the second network node. The operations of 1615 may be performed in accordance with examples as disclosed herein. In some aspects, aspects of the operations of 1615 may be performed by an authentication parameter manager 1155 as described with reference to FIG. 11.

At 1620, the method may include transmitting, based on the determination, a third signal conveying a third phase to the second network node, where the third phase is indicative of a signature parameter. The operations of 1620 may be performed in accordance with examples as disclosed herein. In some aspects, aspects of the operations of 1620 may be performed by a third phase transmission manager 1160 as described with reference to FIG. 11.

At 1625, the method may include communicating with the second network node based on the signature parameter. The operations of 1625 may be performed in accordance with examples as disclosed herein. In some aspects, aspects of the operations of 1625 may be performed by a secured communications manager 1140 as described with reference to FIG. 11.

Figure 17:
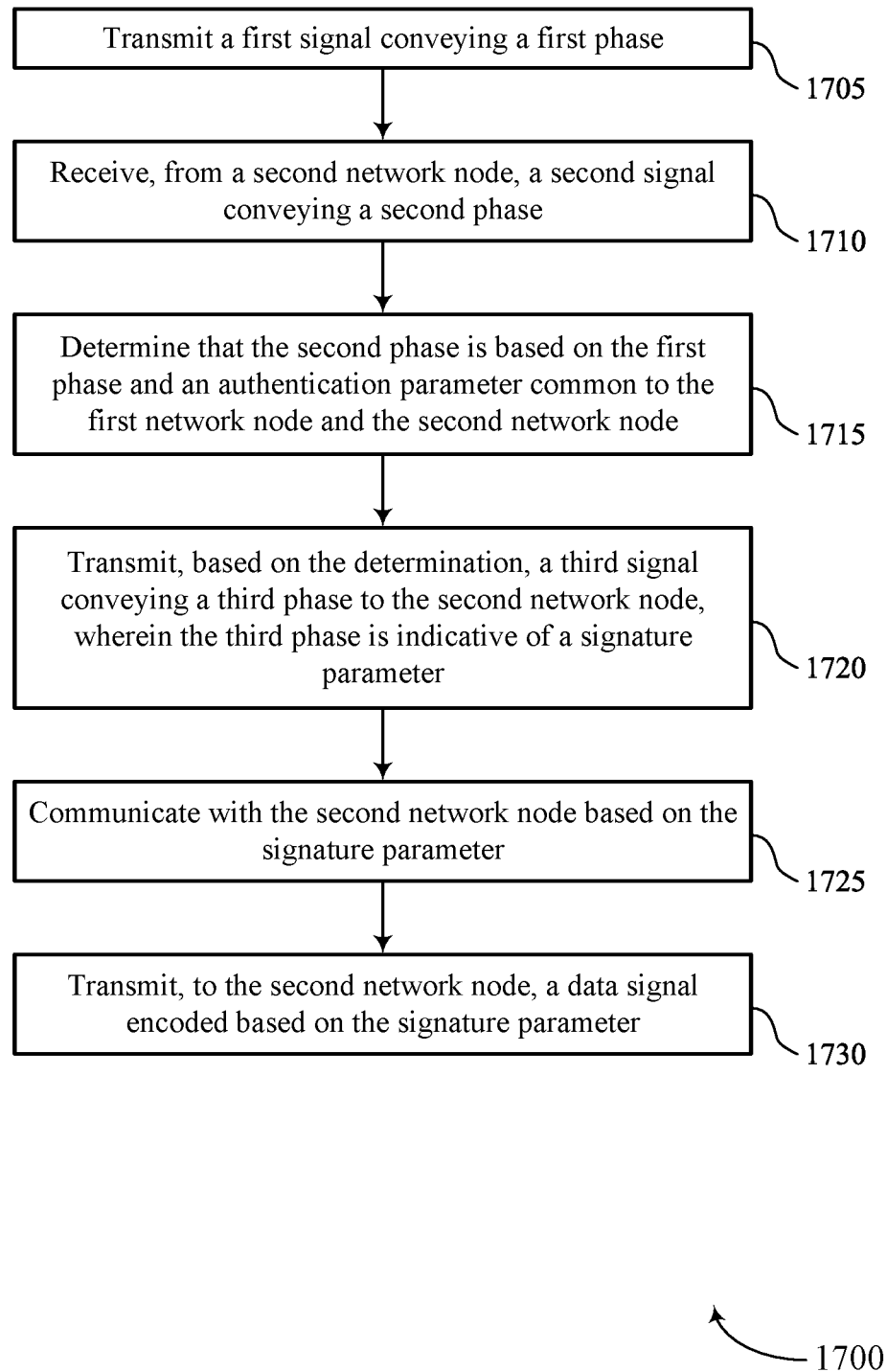

FIG. 17 shows a flowchart illustrating a method 1700 that supports secure configuration sharing over reference signals in accordance with one or more aspects of the present disclosure. The operations of the method 1700 may be implemented by a network entity or a UE or its components as described herein. For example, the operations of the method 1700 may be performed by a network entity or a UE 115 as described with reference to FIGS. 1 through 3 and 9 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1705, the method may include transmitting a first signal conveying a first phase. The operations of 1705 may be performed in accordance with examples as disclosed herein. In some aspects, aspects of the operations of 1705 may be performed by a first phase transmission manager 1145 as described with reference to FIG. 11.

At 1710, the method may include receiving, from a second network node, a second signal conveying a second phase. The operations of 1710 may be performed in accordance with examples as disclosed herein. In some aspects, aspects of the operations of 1710 may be performed by a second phase reception manager 1150 as described with reference to FIG. 11.

At 1715, the method may include determining that the second phase is based on the first phase and an authentication parameter common to the first network node and the second network node. The operations of 1715 may be performed in accordance with examples as disclosed herein. In some aspects, aspects of the operations of 1715 may be performed by an authentication parameter manager 1155 as described with reference to FIG. 11.

At 1720, the method may include transmitting, based on the determination, a third signal conveying a third phase to the second network node, where the third phase is indicative of a signature parameter. The operations of 1720 may be performed in accordance with examples as disclosed herein. In some aspects, aspects of the operations of 1720 may be performed by a third phase transmission manager 1160 as described with reference to FIG. 11.

At 1725, the method may include communicating with the second network node based on the signature parameter. The operations of 1725 may be performed in accordance with examples as disclosed herein. In some aspects, aspects of the operations of 1725 may be performed by a secured communications manager 1140 as described with reference to FIG. 11.

At 1730, the method may include transmitting, to the second network node, a data signal encoded based on the signature parameter. The operations of 1730 may be performed in accordance with examples as disclosed herein. In some aspects, aspects of the operations of 1730 may be performed by a secured communications manager 1140 as described with reference to FIG. 11.

The following provides an overview of aspects of the present disclosure:

Aspect 1: A method for wireless communications at a first network node, comprising: receiving, from a second network node, a first signal conveying a first phase; transmitting, to the second network node, a second signal conveying a second phase, wherein the second phase is based on an authentication parameter common to the first network node and the second network node and the first phase; receiving, from the second network node, a third signal conveying a third phase, wherein the third phase is indicative of a signature parameter, and wherein the third signal is responsive to the second signal; and communicating with the second network node based on the signature parameter.

Aspect 2: The method of aspect 1, wherein communicating with the second network node based on the signature parameter comprises: receiving, from the second network node, a data signal; and decoding the data signal based on the signature parameter.

Aspect 3: The method of any of aspects 1 through 2, wherein communicating with the second network node based on the signature parameter comprises: using the signature parameter in communications with the second network node during a period of time.

Aspect 4: The method of aspect 3, wherein communicating with the second network node based on the signature parameter comprises: determining, after the period of time, a second signature parameter for second communications with the second network node during a second period of time.

Aspect 5: The method of any of aspects 1 through 4, wherein the signature parameter is based on the third phase and the second phase.

Aspect 6: The method of any of aspects 1 through 5, further comprising: receiving, via a layer three signal, the authentication parameter before transmission of the second signal.

Aspect 7: The method of aspect 6, wherein receiving the authentication parameter via the layer three signal comprises: receiving the layer three signal from the second network node.

Aspect 8: The method of any of aspects 1 through 7, further comprising: determining, based on error correction information conveyed via the third signal, that the signature parameter is incorrect, wherein communicating with the second network node based on the signature parameter comprises transmitting a negative acknowledgement to the second network node indicative of that the signature parameter is incorrect.

Aspect 9: The method of aspect 8, wherein the error correction information comprises first cyclic redundancy check information associated with the signature parameter, and wherein determining, based on the error correction information, that the signature parameter is incorrect comprises: comparing the first cyclic redundancy check information to expected cyclic redundancy check information.

Aspect 10: The method of any of aspects 1 through 7, further comprising: determining, based on error correction information conveyed via the third signal, that the signature parameter is correct, wherein communicating with the second network node based on the signature parameter comprises refraining from transmission of a negative acknowledgement to the second network node indicative of an incorrect signature parameter.

Aspect 11: The method of any of aspects 1 through 10, further comprising: determining a phase error threshold and a phase error level of a channel via which the first signal, the second signal, and the third signal are communicated; and determining the signature parameter based on the phase error level being less than the phase error threshold.

Aspect 12: The method of any of aspects 1 through 11, wherein the first signal comprises an authentication request, the second signal comprises a configuration request and authentication response, and the third signal comprises a configuration response.

Aspect 13: The method of any of aspects 1 through 12, wherein the first signal conveys a request for a prior signature parameter, and the authentication parameter comprises the prior signature parameter.

Aspect 14: The method of any of aspects 1 through 13, wherein the first signal is received, the second signal is transmitted, and the third signal is received within a time period that is less than a channel coherence time period.

Aspect 15: A method for wireless communications at a first network node, comprising: transmitting a first signal conveying a first phase; receiving, from a second network node, a second signal conveying a second phase; determining that the second phase is based on the first phase and an authentication parameter common to the first network node and the second network node; transmitting, based on the determination, a third signal conveying a third phase to the second network node, wherein the third phase is indicative of a signature parameter; and communicating with the second network node based on the signature parameter.

Aspect 16: The method of aspect 15, wherein communicating with the second network node based on the signature parameter comprises: transmitting, to the second network node, a data signal encoded based on the signature parameter.

Aspect 17: The method of any of aspects 15 through 16, wherein communicating with the second network node based on the signature parameter comprises: using the signature parameter in communications with the second network node during a period of time.

Aspect 18: The method of aspect 17, wherein communicating with the second network node based on the signature parameter comprises: determining, after the period of time, a second signature parameter for second communications with the second network node during a second period of time.

Aspect 19: The method of any of aspects 15 through 18, wherein determining that the second phase is based on the authentication parameter comprises: determining that the second phase is within a threshold of an expected second phase.

Aspect 20: The method of any of aspects 15 through 19, wherein the third phase is based on the second phase and the signature parameter.

Aspect 21: The method of any of aspects 15 through 20, further comprising: receiving, from a third network node, a fourth signal conveying a fourth phase, determining a second authentication parameter associated with the third network node based on the fourth phase and the first phase; and determining that the second authentication parameter is not within a threshold of an expected authentication parameter.

Aspect 22: The method of any of aspects 15 through 21, further comprising: transmitting, to the second network node, the authentication parameter via a layer three signal before reception of the second signal.

Aspect 23: The method of any of aspects 15 through 22, further comprising: receiving the authentication parameter before reception of the second signal and via a layer three signal.

Aspect 24: The method of any of aspects 15 through 23, further comprising: randomly determining the first phase.

Aspect 25: The method of any of aspects 15 through 24, further comprising: transmitting, with the third signal, error correction information, wherein communicating with the second network node based on the signature parameter comprises receiving a negative acknowledgement from the second network node corresponding to the signature parameter.

Aspect 26: The method of any of aspects 15 through 25, further comprising: determining a phase error threshold and a phase error level of a channel via which the first signal, the second signal, and the third signal are communicated; and determining the authentication parameter based on the phase error level being less than the phase error threshold.

Aspect 27: The method of any of aspects 15 through 26, wherein the first signal comprises an authentication request, the second signal comprises a configuration request and authentication response, and the third signal comprises a configuration response.

Aspect 28: The method of any of aspects 15 through 27, wherein the first signal conveys a request for a prior signature parameter, and the authentication parameter comprises the prior signature parameter.

Aspect 29: The method of any of aspects 15 through 28, further comprising: applying an authentication test to the authentication parameter, and wherein transmitting the third signal based on the authentication test.

Aspect 30: The method of aspect 29, wherein the authentication test comprises one of a distribution-based hypothesis test or a hamming-distance-based similarity test.

Aspect 31: The method of any of aspects 15 through 30, further comprising: determining that the authentication parameter is authentic, wherein transmitting the third signal is based on the determination that the authentication parameter is authentic.

Aspect 32: The method of any of aspects 15 through 31, wherein reception of the first signal, transmission of the second signal, and reception of the third signal occur within a period of time less than a channel coherence time period.

Aspect 33: A first network node for wireless communication, comprising: a memory; and at least one processor coupled to the memory, wherein the at least one processor is configured to perform a method of any of aspects 1 through 14.

Aspect 34: An apparatus for wireless communications at a first network node, comprising at least one means for performing a method of any of aspects 1 through 14.

Aspect 35: A non-transitory computer-readable medium having code for wireless communication stored thereon that, when executed by a first network node, causes the first network node to perform a method of any of aspects 1 through 14.

Aspect 36: A first network node for wireless communication, comprising: a memory; and at least one processor coupled to the memory, wherein the at least one processor is configured to perform a method of any of aspects 15 through 32.

Aspect 37: An apparatus for wireless communications at a first network node, comprising at least one means for performing a method of any of aspects 15 through 32.

Aspect 38: A non-transitory computer-readable medium having code for wireless communication stored thereon that, when executed by a first network node, causes the first network node to perform a method of any of aspects 15 through 32.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory; and
   at least one processor coupled to the memory, wherein the at least one processor is configured to:
      receive, from a second network node, a first signal conveying a first phase;
      transmit, to the second network node, a second signal conveying a second phase, wherein the second phase is based on an authentication parameter common to the first network node and the second network node and the first phase;
      receive, from the second network node, a third signal conveying a third phase, wherein the third phase is indicative of a signature parameter, and wherein the third signal is responsive to the second signal, wherein the signature parameter is based on the third phase and the second phase; and
      communicate with the second network node based on the signature parameter.

2. The first network node of claim 1, wherein, to communicate with the second network node based on the signature parameter, the at least one processor is configured to:
   receive, from the second network node, a data signal; and
   decode the data signal based on the signature parameter.

3. The first network node of claim 1, wherein, to communicate with the second network node based on the signature parameter, the at least one processor is configured to:
   use the signature parameter in communications with the second network node during a period of time.

4. The first network node of claim 3, wherein, to communicate with the second network node based on the signature parameter, the at least one processor is configured to:
   determine, after the period of time, a second signature parameter for second communications with the second network node during a second period of time.

5. The first network node of claim 1, wherein the at least one processor is configured to:
   receive, via a layer three signal, the authentication parameter before transmission of the second signal.

6. The first network node of claim 5, wherein, to receive the authentication parameter via the layer three signal, the at least one processor is configured to:
   receive the layer three signal from the second network node.

7. The first network node of claim 1, wherein the third signal conveys error correction information, and wherein the at least one processor is configured to:
   determine, based on the error correction information, that the signature parameter is incorrect, wherein, to communicate with the second network node based on the signature parameter, the at least one processor is configured to transmit a negative acknowledgement to the second network node indicative of that the signature parameter is incorrect.

8. The first network node of claim 7, wherein the error correction information comprises first cyclic redundancy check information associated with the signature parameter, and wherein to determine, based on the error correction information, that the signature parameter is incorrect, the at least one processor is configured to:
   compare the first cyclic redundancy check information to expected cyclic redundancy check information.

9. The first network node of claim 1, wherein the third signal conveys error correction information, and wherein the at least one processor is configured to:
   determine, based on the error correction information, that the signature parameter is correct, wherein to communicate with the second network node based on the signature parameter, the at least one processor is configured to refrain from transmission of a negative acknowledgement to the second network node indicative of an incorrect signature parameter.

10. The first network node of claim 1, wherein the at least one processor is configured to:
    determine a phase error threshold and a phase error level of a channel via which the first signal, the second signal, and the third signal are communicated; and
    determine the signature parameter based on the phase error level being less than the phase error threshold.

11. A first network node for wireless communication, comprising:
    a memory; and
    at least one processor coupled to the memory, wherein the at least one processor is configured to:
       receive, from a second network node, a first signal conveying a first phase, wherein the first signal conveys a request for a prior signature parameter;
       transmit, to the second network node, a second signal conveying a second phase, wherein the second phase is based on an authentication parameter common to the first network node and the second network node and the first phase, wherein the authentication parameter comprises the prior signature parameter;
       receive, from the second network node, a third signal conveying a third phase, wherein the third phase is indicative of a signature parameter, and wherein the third signal is responsive to the second signal; and
       communicate with the second network node based on the signature parameter.

12. A first network node for wireless communication, comprising:
a memory; and
at least one processor coupled to the memory, wherein the at least one processor is configured to:
transmit a first signal conveying a first phase;
receive, from a second network node, a second signal conveying a second phase;
determine that the second phase is based on the first phase and an authentication parameter common to the first network node and the second network node;
transmit, based on the determination, a third signal conveying a third phase to the second network node, wherein the third phase is indicative of a signature parameter, wherein the third phase is based on the second phase and the signature parameter; and
communicate with the second network node based on the signature parameter.

13. The first network node of claim 12, wherein, to communicate with the second network node based on the signature parameter, the at least one processor is configured to:
transmit, to the second network node, a data signal encoded based on the signature parameter.

14. The first network node of claim 13, wherein, to communicate with the second network node based on the signature parameter, the at least one processor is configured to:
use the signature parameter in communications with the second network node during a period of time.

15. The first network node of claim 14, wherein, to communicate with the second network node based on the signature parameter, the at least one processor is configured to:
determine, after the period of time, a second signature parameter for second communications with the second network node during a second period of time.

16. The first network node of claim 12, wherein, to determine that the second phase is based on the authentication parameter, the at least one processor is configured to determine that the second phase is within a threshold of an expected second phase.

17. The first network node of claim 12, wherein the at least one processor is configured to:
receive, from a third network node, a fourth signal conveying a fourth phase;
determine a second authentication parameter associated with the third network node based on the fourth phase and the first phase; and
determine that the second authentication parameter is not within a threshold of an expected authentication parameter.

18. The first network node of claim 12, wherein the at least one processor is configured to:
transmit, to the second network node, the authentication parameter via a layer three signal before reception of the second signal.

19. The first network node of claim 12, wherein the at least one processor is configured to:
receive the authentication parameter before reception of the second signal and via a layer three signal.

20. The first network node of claim 12, wherein the at least one processor is configured to:
randomly determine the first phase.

21. The first network node of claim 12, wherein the at least one processor is configured to:
transmit, with the third signal, error correction information, wherein, to communicate with the second network node based on the signature parameter, the at least one processor is configured to receive a negative acknowledgement from the second network node corresponding to the signature parameter.

22. The first network node of claim 12, wherein the at least one processor is configured to:
determine a phase error threshold and a phase error level of a channel via which the first signal, the second signal, and the third signal are communicated; and
determine the authentication parameter based on the phase error level being less than the phase error threshold.

23. A first network node for wireless communication, comprising:
a memory; and
at least one processor coupled to the memory, wherein the at least one processor is configured to:
transmit a first signal conveying a first phase, wherein the first signal conveys a request for a prior signature parameter;
receive, from a second network node, a second signal conveying a second phase;
determine that the second phase is based on the first phase and an authentication parameter common to the first network node and the second network node, wherein the authentication parameter comprises the prior signature parameter;
transmit, based on the determination, a third signal conveying a third phase to the second network node, wherein the third phase is indicative of a signature parameter; and
communicate with the second network node based on the signature parameter.

24. The first network node of claim 12, wherein the at least one processor is configured to:
apply an authentication test to the authentication parameter, and wherein the at least one processor is configured to transmit the third signal based on the authentication test.

25. The first network node of claim 24, wherein the authentication test comprises one of a distribution-based hypothesis test or a hamming-distance-based similarity test.

26. The first network node of claim 12, wherein the at least one processor is configured to:
determine that the authentication parameter is authentic, wherein, to transmit the third signal, the at least one processor is configured to transmit the third signal based on the determination that the authentication parameter is authentic.

* * * * *